US012429801B2

(12) United States Patent
Honke

(10) Patent No.: US 12,429,801 B2
(45) Date of Patent: Sep. 30, 2025

(54) IMAGE HEATING APPARATUS AND IMAGE FORMING APPARATUS

(71) Applicant: CANON KABUSHIKI KAISHA, Tokyo (JP)

(72) Inventor: Takashi Honke, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/735,445

(22) Filed: Jun. 6, 2024

(65) Prior Publication Data

US 2024/0319639 A1 Sep. 26, 2024

Related U.S. Application Data

(63) Continuation of application No. 17/748,298, filed on May 19, 2022, now Pat. No. 12,038,702.

(30) Foreign Application Priority Data

May 25, 2021 (JP) ................................ 2021-087676

(51) Int. Cl.
*G03G 15/20* (2006.01)

(52) U.S. Cl.
CPC ................................ *G03G 15/2039* (2013.01)

(58) Field of Classification Search
CPC ................................................. G03G 15/2039
See application file for complete search history.

(56) References Cited

U.S. PATENT DOCUMENTS 7,142,793 B1 11/2006 Potter et al.
10,969,712 B2 4/2021 Sako et al.
(Continued)

FOREIGN PATENT DOCUMENTS

CN 104345616 A 2/2015
CN 105446101 A 3/2016
(Continued)

OTHER PUBLICATIONS

Office Action issued in Chinese Appln. No. 202210560899.7, mailed Oct. 30, 2024. English machine translation provided.
(Continued)

*Primary Examiner* — Stephanie E Bloss
*Assistant Examiner* — Michael A Harrison
(74) *Attorney, Agent, or Firm* — ROSSI, KIMMS & McDOWELL LLP

(57) ABSTRACT

In an image heating apparatus, a plurality of heat-generating members that a heater has include a first heat-generating member group and a second heat-generating member group, symmetrically laid out with a conveyance reference position of a recording material. A control portion supplies electric power via first and second common circuits to the first heat-generating member group and the second heat-generating member group. A temperature-detecting portion includes a first temperature-detecting element for detecting a temperature of one of the heat-generating members included in the first heat-generating member group, and a second temperature-detecting element for detecting the temperature of one of the heat-generating members included in the second heat-generating member group. The first temperature-detecting element is placed on one side as to the conveyance reference position in the width direction, and the second temperature-detecting element is placed on other side as to the conveyance reference position in the width direction.

8 Claims, 15 Drawing Sheets

(56) References Cited

U.S. PATENT DOCUMENTS

| | | | | |
|---|---|---|---|---|
| 11,822,272 | B2 | 11/2023 | Endo | |
| 2016/0085187 | A1* | 3/2016 | Takagi | G03G 15/2053 399/69 |
| 2017/0363999 | A1* | 12/2017 | Miyauchi | G03G 15/2021 |
| 2018/0253043 | A1 | 9/2018 | Shimura et al. | |
| 2019/0041779 | A1 | 2/2019 | Takagi et al. | |
| 2019/0212686 | A1 | 7/2019 | Mori | |
| 2020/0026227 | A1 | 1/2020 | Iwasaki | |
| 2023/0266701 | A1 | 8/2023 | Miyauchi et al. | |

FOREIGN PATENT DOCUMENTS

| | | | |
|---|---|---|---|
| CN | 107526270 | A | 12/2017 |
| JP | 2015194713 | A | 11/2015 |
| JP | 2017054071 | A | 3/2017 |
| JP | 2017054103 | A | 3/2017 |
| JP | 2017227866 | A | 12/2017 |
| JP | 2018017906 | A | 2/2018 |
| JP | 2018017910 | A | 2/2018 |
| JP | 2018194682 | A | 12/2018 |
| JP | 2019120808 | A | 7/2019 |
| JP | 2020034621 | A | 3/2020 |
| JP | 2021076664 | A | 5/2021 |

OTHER PUBLICATIONS

Office Action issued in U.S. Appl. No. 17/748,298, mailed May 11, 2023.

Office Action issued in U.S. Appl. No. 17/748,298, mailed Nov. 24, 2023.

Notice of Allowance issued in U.S. Appl. No. 17/748,298, mailed Mar. 11, 2024.

* cited by examiner

IMAGE HEATING APPARATUS AND IMAGE FORMING APPARATUS

BACKGROUND OF THE INVENTION

Field of the Invention

The present invention relates to an image forming apparatus such as a printer, photocopier, or the like, using an electrophotographic system. The present invention also relates to an image heating apparatus, such as a fixing unit installed in the image forming apparatus, a gloss imparting apparatus that improves gloss value of a toner image by reheating the toner image fixed on a recording material, and so forth.

Description of the Related Art

A film-heating-system fixing apparatus is known as a fixing apparatus used in an electrophotographic-system image forming apparatus. A problem of high temperature at non-sheet-feeding portions, which will be described below, is known in film-heating-system fixing apparatuses. This high temperature at non-sheet-feeding portions is a phenomenon in which, when small-sized sheets are consecutively printed with the image forming apparatus using this fixing apparatus, temperature of regions of a nip portion in the longitudinal direction over which sheets do not pass gradually rises. When the temperature of non-sheet-feeding portions becomes excessively high, various parts within the apparatus, such as a heater, fixing film, a pressure roller, and so forth, will be damaged. Also, when printing large-sized sheets in a state in which high temperature at non-sheet-feeding portions is occurring, a phenomena of hot offset of toner may occur in regions corresponding to the non-sheet-feeding portions of small-sized sheets.

A fixing apparatus having a configuration described in Japanese Patent Application Publication No. 2017-54071 is proposed as a technique to suppress such high temperature at non-sheet-feeding portions. That is to say, this is a fixing apparatus having a heater laid out with heat-generating members divided on a substrate in the longitudinal direction (hereinafter, divided heater). Using this configuration enables heat-generating resistors on the heater to be divided into a plurality of heat-generating regions (hereinafter referred to as "heat-generating blocks HB") in the longitudinal direction of the heater, and the heat-generating distribution of the heater can be switched in accordance with the size of recording material. Thus, high temperature at non-sheet-feeding portions can be suppressed even in cases of feeding small-sized sheets.

Further, Japanese Patent Application Publication No. 2017-54071 also proposes a configuration in which circuits for supplying electric power to the plurality of heat-generating members are shared in common. That is to say, this is a configuration for performing electric power supply to the plurality of heat-generating blocks disposed in lateral symmetry as to the center of sheets, using drives shared in common. Employing this configuration enables reduced size of the apparatus, reduced costs, and energy conservation to be realized.

SUMMARY OF THE INVENTION

In a case of using a fixing apparatus that uses the above divided heater, temperature control needs to be performed for each drive circuit. That is to say, a temperature-detecting element needs to be disposed in at least one out of each set of heat-generating blocks HB performing electric power feed by the same drive, and control to decide electric power to be applied to the drive circuit, i.e., temperature regulation control, needs to be performed using temperature detection results from the temperature-detecting element. Thermistors are used as the temperature-detecting elements here from the perspectives of function and cost.

Now, there are cases in which there is variance in resistance values of heat-generating members making up the heater, and when there is variance in resistance distribution in the longitudinal direction in particular, lateral difference in fixability due to the variance in heat generation distribution may become great in some cases. In such cases, performing precise temperature regulation control may become difficult depending on the layout of the temperature-detecting elements, and can lead to occurrence of faulty fixing or hot offset.

It is an object of the present invention to provide an image heating apparatus that is capable of highly-precise temperature regulation control.

In order to solve the above problems, an image heating apparatus according to the present invention includes:

- a heater that includes a plurality of heat-generating members arrayed in a width direction of a recording material that is orthogonal to a conveying direction of the recording material;
- a nip forming portion forming a nip that nips the recording material;
- a temperature-detecting portion that detects a temperature of the heater; and
- a control portion that controls electric power to be supplied to the plurality of heat-generating members, on the basis of the temperature detected by the temperature-detecting portion,
- wherein the image heating apparatus heats an image formed on recording material nipped by the nip, by heat of the heater,
- wherein the plurality of heat-generating members have a first heat-generating member group and a second heat-generating member group,
- wherein the first heat-generating member group includes a plurality of heat-generating members symmetrically laid out with a conveyance reference position of the recording material in the width direction as a reference, and the second heat-generating member group includes a plurality of heat-generating members symmetrically laid out with the conveyance reference position as a reference, placed at positions in the width direction different from the positions at which the plurality of heat-generating member of the first heat-generating member group are placed,
- wherein the temperature-detecting portion includes a first temperature-detecting element for detecting the temperature of one of the heat-generating members included in the first heat-generating member group, and a second temperature-detecting element for detecting the temperature of one of the heat-generating members included in the second heat-generating member group,
- wherein, in a case of heating the image formed on the recording material at the nip portion, the control portion supplies electric power via a first common circuit to the first heat-generating member group to maintain a detected temperature detected by the first temperature-detecting element at a control target temperature, and supplies electric power via a second common circuit to the second heat-generating member group to maintain a detected temperature detected by the second temperature-detecting element at a control target temperature, wherein the first temperature-detecting element is placed on one side as to the conveyance reference position in the width direction, and wherein the second temperature-detecting element is placed on other side as to the conveyance reference position in the width direction.

Also, in order to solve the above problems, an image forming apparatus according to the present invention includes:

an image forming portion that forms an image on a recording material; and a fixing portion that fixes the image formed on the recording material onto the recording material, wherein the fixing portion is the image heating apparatus of the present invention.

As described above, according to the present invention, precision of temperature regulation control of an image heating apparatus can be raised.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1:
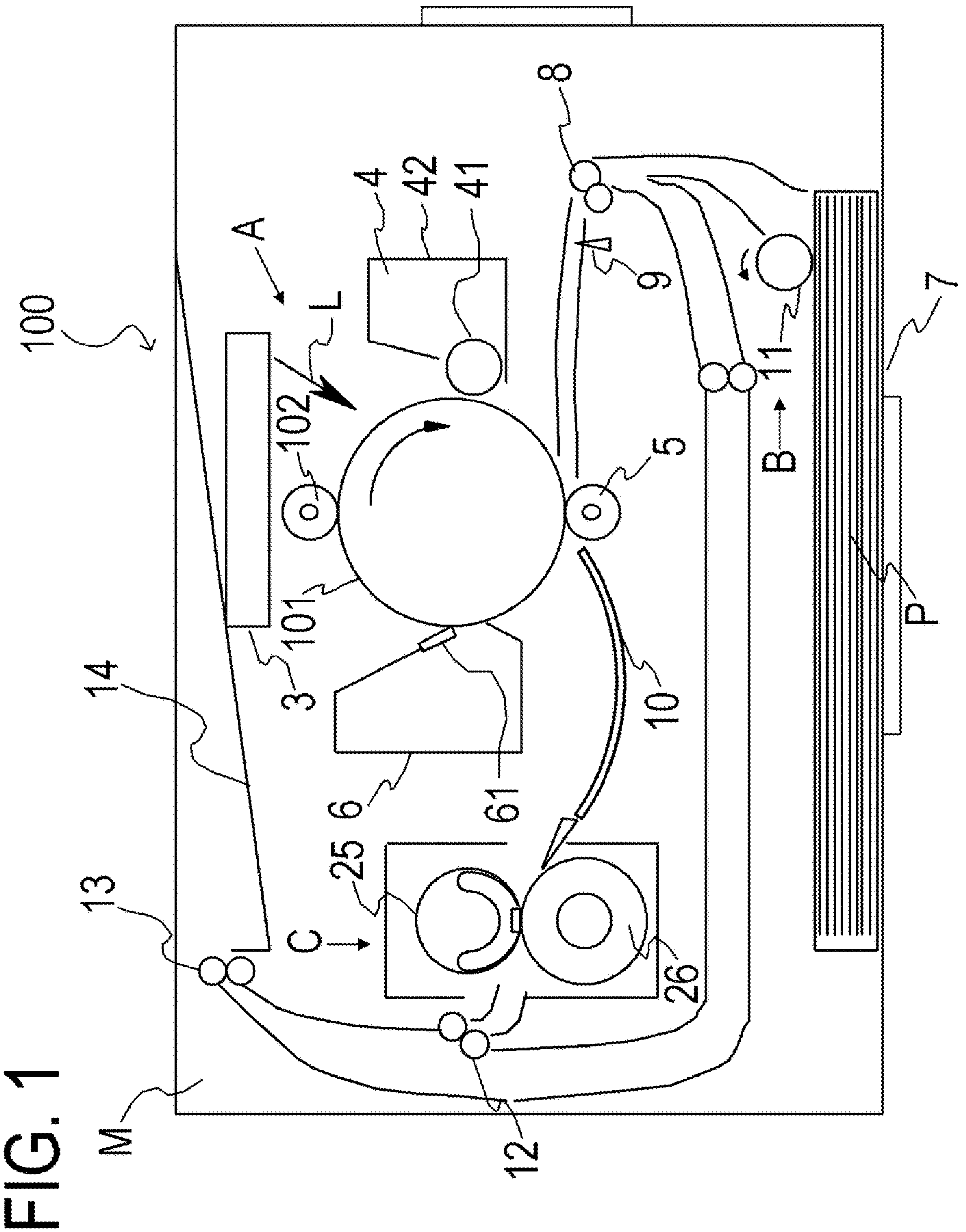
FIG. 1 is a schematic cross-sectional view of an image forming apparatus according to a first embodiment.

FIG. 1 is a schematic cross-sectional view of an image forming apparatus according to an embodiment of the present invention, using electrophotographic recording technology. Examples of image forming apparatuses to which the present invention is applicable include photocopiers, printers, and so forth, using an electrophotographic system or electrostatic recording system. An arrangement in which application has been made to a laser printer that forms images on a recording material P such as recording paper or the like, using an electrophotographic system, will be described here.

Overall Configuration of Image Forming Apparatus

FIG. 1 is a schematic cross-sectional view of an example of the image forming apparatus according to a first embodiment of the present invention. This image forming apparatus includes an image forming portion A that forms toner images on recording material, a recording material feeding portion B that feeds recording material out to the image forming portion A, and a fixing portion (fixing apparatus) C that performs heat fixing of the toner images onto the recording material. The image forming portion A includes an electrophotographic photosensitive member that is a drum-type member (hereinafter referred to as "photosensitive drum") 101 as an image bearing member. This photosensitive drum 101 is rotatably supported by an image forming apparatus main member M that makes up housing of the image forming apparatus. Disposed around an outer circumferential face of the photosensitive drum 101 are, in order along the direction of rotation thereof, a charging roller 102, a laser scanner 3, a developing apparatus 4, a transfer roller 5, and a cleaning apparatus 6. The recording material feeding portion B includes a feeding roller 11. This feeding roller 11 is rotated by a conveyance driving motor that is omitted from illustration, in the direction of the arrow at a predetermined timing, and feeds out recording material P accommodated in a cassette 7 by stacking onto a conveyance path.

The image forming apparatus according to the first embodiment has a control portion, omitted from illustration, that controls the image forming portion A, the recording material feeding portion B, the fixing apparatus C, and so forth. The control portion is made up from a central processing unit (CPU), and memory such as read-only memory (ROM), random-access memory (RAM), and so forth, with various types of programs necessary for image forming stored in the memory. This control portion receives print signals from an external apparatus such as a host computer or the like, and executes a predetermined image forming control sequence on the basis of the print signals. Accordingly, a drum motor is rotationally driven, and the photosensitive drum 101 rotates in the direction of the arrow at a predetermined circumferential speed (process speed). The surface of the photosensitive drum 101 that is rotating is uniformly charged to a predetermined potential of the same polarity as toner (negative polarity here), by the charging roller 102. The laser scanner 3 scans the charged face on the surface of the photosensitive drum 101 by a laser beam L on the basis of image information, thereby exposing the surface of the photosensitive drum 101. Charges of exposed portions are removed by this exposure, thereby forming an electrostatic latent image on the surface of the photosensitive drum 101.

The developing apparatus 4 includes a developing roller 41, and a toner container 42 that accommodates toner. The toner is rubbed by a member such as a urethan blade or the like, omitted from illustration, so as to be charged to a predetermined polarity (negative polarity in the first embodiment). This developing apparatus 4 applies negative voltage to the developing roller 41 by a developing voltage power source that is omitted from illustration, thereby causing the toner to adhere to the electrostatic latent image on the surface of the photosensitive drum 101 utilizing potential difference, thus developing the electrostatic latent image as a toner image T. Positive voltage, which is of opposite polarity to the toner, is applied to the transfer roller 5, whereby the toner image T formed on the surface of the photosensitive drum 101 is transferred to the recording material P, utilizing the potential difference from the transfer voltage. Also, the conveyance driving motor that is provided to the recording material feeding portion B is rotationally driven, and the feeding roller 11 feeds out the recording material P from the cassette 7 to a conveying roller 8. The recording material P is conveyed by the conveying roller 8, passes a top sensor 9, and is conveyed to a transfer nip portion between the surface of the photosensitive drum 101 and an outer circumferential face of the transfer roller 5. The recording material P, onto which the toner image formed on the surface of the photosensitive drum 101 has been transferred, is conveyed following a conveyance guide 10 to the fixing apparatus C. The toner image on the recording material P is heated and subjected to pressure at this fixing apparatus C, and thereby is heat-fixed onto the recording material P. The recording material P onto which the toner image T has been heat fixed is conveyed by a conveying roller 12 and a discharge roller 13 in that order, and is discharged onto a discharge tray 14 on an upper face of the apparatus main member M. Transfer residual toner remaining on the surface of the photosensitive drum 101 after transferring the toner image onto the recording material P is removed by a cleaning blade 61 of the cleaning apparatus 6, and is accumulated within the cleaning apparatus 6. Successive printing is performed by repeating the above actions. In a case of A4 size, the image forming apparatus according to the first embodiment can perform printing at a printing speed of 70 prints per minute. Although details are omitted from description here, the image forming apparatus according to the first embodiment is provided with a reversal conveyance path enabling duplex image formation, and is configured such that the recording material P on which an image has been formed on one face is returned to an upstream side of the image forming portion A by switchback, by the discharge roller 13 rotating in reverse.

Configuration of Fixing Apparatus

Figure 2:
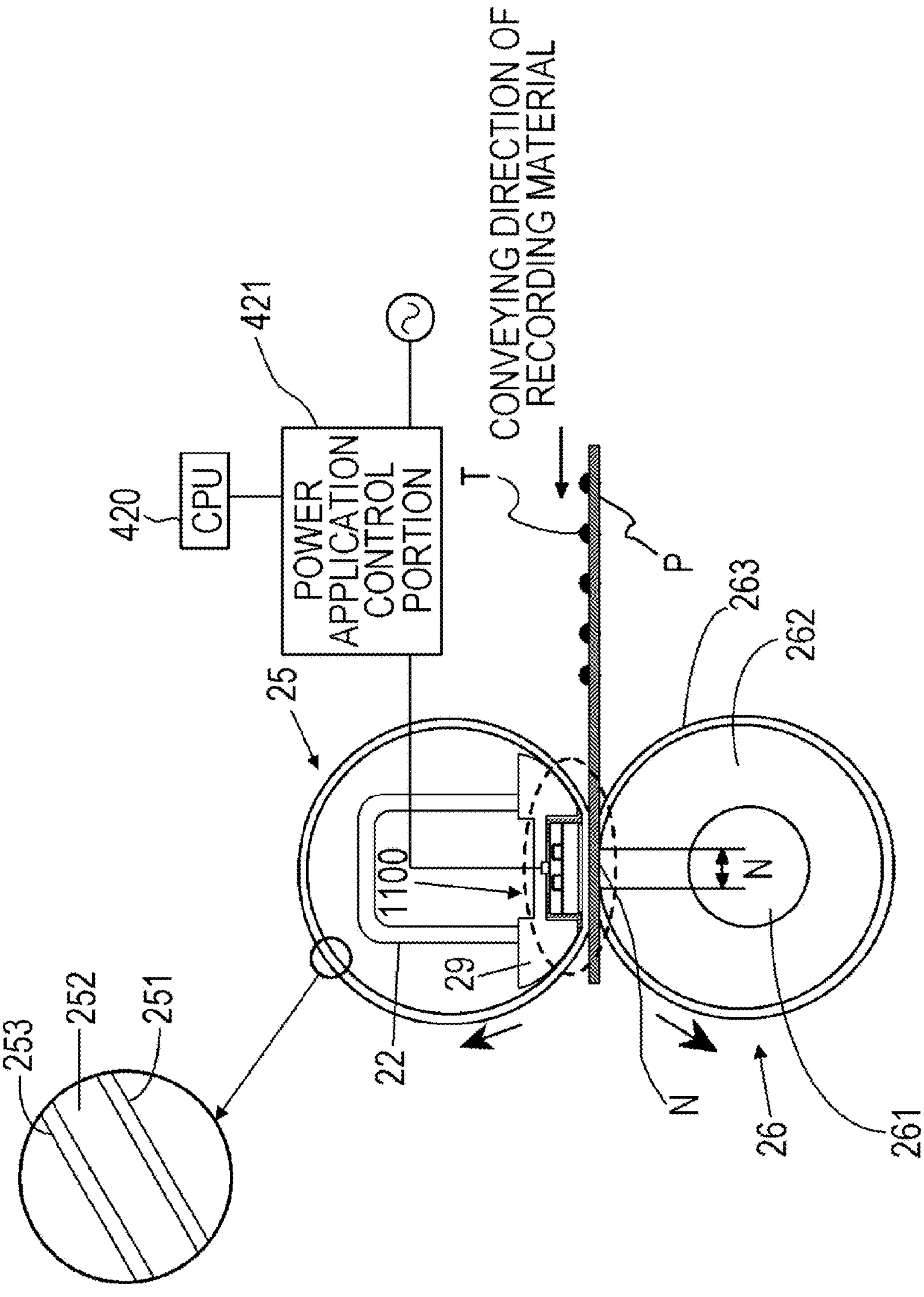
FIG. 2 is a schematic cross-sectional side view of a fixing apparatus according to the first embodiment.

FIG. 2 is a schematic cross-sectional side view of the fixing apparatus C serving as an image heating apparatus according to the first embodiment. The fixing apparatus C according to the first embodiment has a basic configuration of a heater 1100, a heater holder 29, a metal stay 22, a fixing film 25 serving as a fixing member, and a pressure roller 26. The heater holder 29 is a holding member that holds (supports) the heater 1100 serving as a heating member, on the inner side of the fixing film 25. The fixing apparatus C nips the recording material P at a nip portion N between the fixing film 25 that is cylindrically formed and serves as a heating rotating member, and the pressure roller 26 serving as a pressure rotating member (pressure member), and performs heat fixing of the toner image T onto the recording material P using the heat of the heater 1100. The nip portion N is formed by the heater 1100 and the pressure roller 26 across the fixing film 25. The recording material P is conveyed being nipped at the nip portion N, by the rotation of the pressure roller 26 and following rotation of the fixing film 25. Although a configuration is made in the present embodiment in which the heater 1100 comes into direct contact with an inner face of the fixing film 25, a heat conducting member or the like may be interposed between the heater 1100 and the inner face of the fixing film 25. Out of the components of the fixing apparatus C according to the present embodiment, the members involved in forming the nip portion N make up a nip forming portion. A power application control portion 421 connected to a commercial alternating current (AC) electric power source supplies electric power to the fixing apparatus C in accordance with signals from a CPU 420.

Pressure Roller

The pressure roller 26 has an elastic layer 262 on an outer circumference of a core shaft portion 261, and has a surface layer 263 on an outer circumference of the elastic layer 262. The outer diameter of the pressure roller 26 is approximately 25 mm. A metal material, such as aluminum, iron, or the like, is used to form the core shaft portion 261 in a solid or a hollow form. In the first embodiment, aluminum is used as a solid core metal material. The elastic layer 262 is made of heat-resistant silicone rubber, which has been made electroconductive by addition of an electricity conducting material such as carbon or the like. The surface layer 263 that comes into contact with the outer face of the fixing film 25 is a releasing tube 10 to 80 μm thick, made of a fluororesin such as a tetrafluoroethylene perfluoroalkyl vinyl ether copolymer (PFA), polytetrafluoroethylene (tetrafluoride) (PTFE), a tetrafluoroethylene hexafluoropropylene copolymer (tetrafluoride, hexafluoride) (FEP). The surface layer 263 is preferably imparted with electroconductivity, from the perspective of preventing charging up during passage of sheets. In the first embodiment, the surface layer 263 of the pressure roller 26 has a configuration in which carbon is added to a 30 μm thick PFA tube as an electroconductive material.

Fixing Film

The fixing film 25 has a cylindrical form that is 24 mm in diameter. The fixing film 25 is flexible, and is loosely fit around the outside of the heater holder 29. As can be seen from the cross-sectional configuration illustrated in a circle in FIG. 2, the fixing film 25 has a multilayered structure of a base layer 251, an elastic layer 252, and a surface layer 253, in that order from the inner side. Generally, a low-thermal-capacity, heat-resistant resin material, such as polyimide, polyamide imide, polyether ether ketone (PEEK), polyethersulfone (PES), or the like, is used as the material for the base layer 251. There also are cases in which a metal material such as stainless steel or the like is used. The base layer 251 is preferably used at a thickness of at least 18 μm and not more than 150 μm, due to the need to satisfy quick-starting characteristics with a small thermal capacity, and also to satisfy mechanical strength at the same time. The base layer 251 according to the first embodiment is a cylindrical polyimide base layer 70 μm thick. The elastic layer 252 is made of a material having elasticity, of which silicone rubber is representative. Providing this elastic layer 252 enables the toner image T to be encompassed and uniformly heated, thereby enabling a good image with no non-uniformities to be obtained. Silicone rubber alone has low thermal conductivity, and accordingly a thermoconductive filler such as alumina, metallic silicon, silicon carbide, zinc oxide, or the like, is added to impart high thermal conductivity to the elastic layer 252. In a high-speed machine such as in the first embodiment, the amount of addition of the thermoconductive filler is adjusted as appropriate, to preferably secure at least 0.9 W/m·K in thermal conductivity. In the first embodiment, alumina and metallic silicon are added to the rubber material of the elastic layer 252 as thermoconductive fillers, so that the thermal conductivity thereof is 1.5 W/m·K. Also, the thickness of the elastic layer 252 is 270 μm. High release capabilities with respect to toner, and high wear resistance, are required of the surface layer 253 serving as a release layer. Fluororesins such as PFA, PTFE, FEP, and so forth are used as the material thereof. Layer formation means includes formation as a coating layer obtained by baking a resin dispersion, or forming as a tubing layer. There also are cases of adding an additive such as carbon or an ion electroconductive material to fluororesin to be used, in order to impart electroconductivity thereto. For the surface layer 253 according to the first embodiment, PFA is used as the fluororesin, no electroconductive material is added, and a tubing layer is formed 20 μm thick.

Heater Holder

The heater 1100 is held by the heater holder 29 that is made of a heat-resistant resin material such as a liquid crystal polymer or the like. The heater holder 29 also functions as a guide to guide rotation of the fixing film 25.

Heater

The heater 1100, which is a characteristic configuration of the first embodiment, will be described with reference to FIGS. 3A to 3C. The heater 1100 includes a substrate 1105 that is made of a ceramic, and heat-generating resistors (heat-generating members) that are provided on the substrate 1105 and generate heat under application of electricity. A surface protective layer 1108 that is made of glass is provided to the substrate 1105, on the side of the sliding surface layer 2 of a face thereof at the nip portion N side that comes into contact with the fixing film 25 (first face), to ensure slidability as to the fixing film 25. A surface protective layer 1107 that is made of glass is provided to the substrate 1105, on a face thereof opposite to the first face at the nip portion N side (second face), for insulation of the heat-generating resistors. An electrode E13 is exposed at the second face, and the heat-generating resistors are electrically connected to an AC electric power source by the electrode E13 coming into contact with an electric contact C13 for feeding electric power.

Figure 3A:
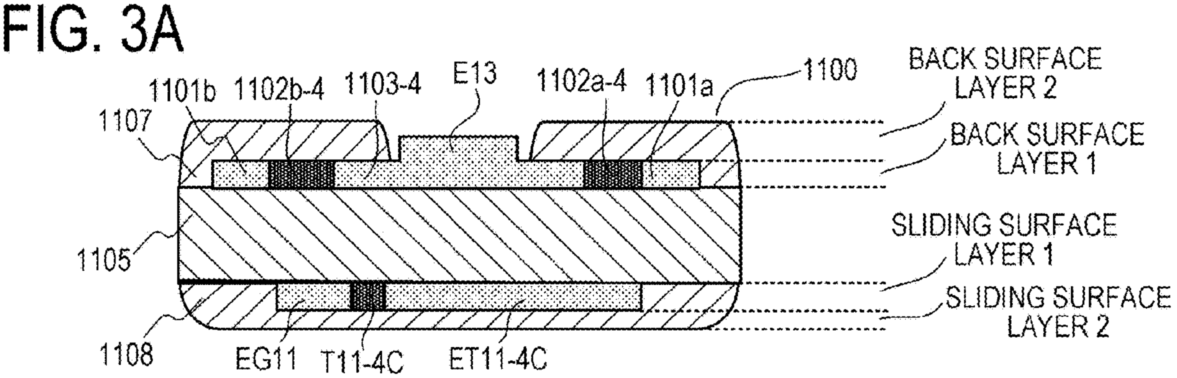
FIGS. 3A to 3C are diagrams illustrating a configuration of a heater according to the first embodiment.
Figure 3B:
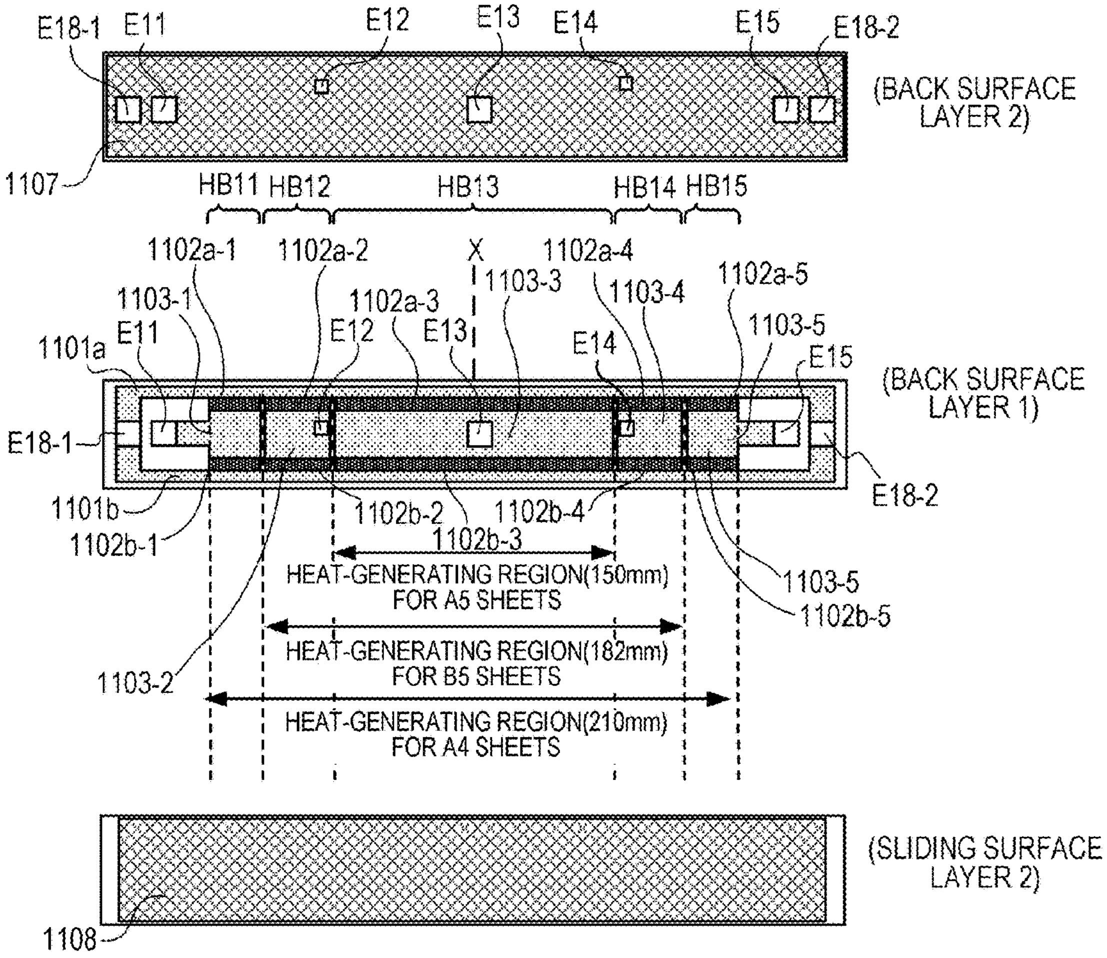

FIGS. 3A and 3B are diagrams illustrating the configuration of the heater 1100 according to the present embodiment. FIG. 3A is a cross-sectional view of the heater 1100 taken at a conveyance reference position X for the recording material P, illustrated in FIG. 3B. FIG. 3B is a plan schematic view of the layers of the heater 1100. FIG. 3C is a plan schematic view of the heater holder that holds the heater 1100. The conveyance reference position X is set at a substantially middle position in the width direction of the recording material P orthogonal to the conveying direction of the recording material P through the fixing apparatus C in the present embodiment, but the set position is not limited to any particular position.

The heater 1100 is made up of the substrate 1105, a sliding surface layer provided on the first face side of the substrate 1105 that comes into contact with the fixing film 25, and a back surface layer 1 provided on the second face side of the substrate 1105 that is on the opposite side from the first face side, and a back surface layer 2 that covers the back surface layer 1. The heater 1100 has a plurality of heat-generating blocks, each made up of a first conductor (conductor AE) 1101, a second conductor (conductor BE) 1103, and a heat-generating member 1102, arrayed in the back surface layer 1 along the longitudinal direction of the substrate 1105. A total of five heat-generating blocks HB11 to HB15 are formed in the heater 1100 according to the present embodiment, by a plurality of heat-generating members 1102*a*-1 to 1102*b*-5 arrayed in the width direction of the recording material P (longitudinal direction of the substrate 1105) orthogonal to the conveying direction of the recording material P.

Figure 3C:
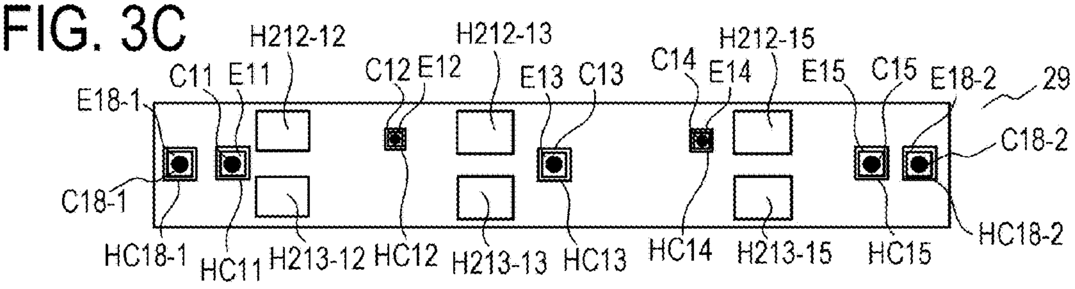

The heater 1100 illustrated in FIGS. 3A to 3C is divided into the heat-generating blocks HB11 to HB15 in the longitudinal direction of the substrate 1105 (in the width direction of the recording material P orthogonal to the conveying direction of the recording material P), laterally symmetrical as to the center of the heater 1100 (symmetrical as to the conveyance reference position X). The positions at which the heat-generating blocks HB are divided correspond to "A5 size", "B5 size", and "A4 size", respectively. That is to say, the width of the heat-generating block HB13 is 150 mm, which is substantially the same as the short side of the A5 size. The width of the heat-generating blocks HB12 to HB14 is 182 mm, which is substantially the same as the short side of the B5 size. The width of the heat-generating blocks HB11 to HB15 is 210 mm, which is substantially the same as the short side of the A4 size. Also, out of these heat-generating blocks HB, the "heat-generating block HB13" is a No. 1 heat-generating group, the "heat-generating block HB12 and heat-generating block HB14" are a No. 2 heat-generating group, and the "heat-generating block HB11 and heat-generating block HB15" are a No. 3 heat-generating group. Electric power feeding to each of the heat-generating groups is performed by the same drive (common circuit), respectively.

The heat-generating member 1102 in each heat-generating block is disposed divided into a heat-generating member 1102*a* on the upstream side in the direction of passage of the recording material P, and a heat-generating member 1102*b* on a downstream side, with respect to the transverse direction of the heater 1100 (the direction orthogonal to the longitudinal direction of the heater 1100). Also, the first conductor 1101 is divided into a conductor 1101*a* that is connected to the heat-generating member 1102*a*, and a conductor 1101*b* that is connected to the heat-generating member 1102*b*.

The heater 1100 is divided into the five heat-generating blocks HB11 to HB15. That is to say, the heat-generating member 1102*a* is divided into the five of 1102*a*-1 to 1102*a*-5. In the same way, the heat-generating member 1102*b* is divided into the five of 1102*b*-1 to 1102*b*-5. Moreover, the second conductor 1103 is also divided into the five of 1103-1 to 1103-5.

The surface protective layer 1107 that is insulating and that covers the heat-generating members 1102, the first conductor 1101, and the second conductor 1103 is provided to the back surface layer 2 of the heater 1100. In the present first embodiment, glass is used as the surface protective layer 1107. Electrodes E11 to E15, E18-1, and E18-2, which come into contact with electric contacts C11 to C15, C18-1, and C18-2, for feeding electric power, are not covered by the surface protective layer 1107. The electrodes E11 to E15 are electrodes for supplying electric power to the heat-generating blocks HB11 to HB15 via the second conductors 1103-1 to 1103-5. The electrodes E18-1 and E18-2 are electrodes for supplying electric power to the heat-generating blocks HB11 to HB15 via the first conductors 1101*a* and 1101*b*.

By providing the electrodes on the rear face of the heater 1100 in this way, there is no more need for providing electroconductive patterns on the substrate 1105 to feed electric power to the second conductors 1103-1 to 1103-5, and accordingly the length of the substrate 1105 in the transverse direction can be reduced. As a result, increased size of the heater 1100 can be suppressed. Note that the electrodes E12 to E14 are disposed in regions in which the heat-generating members are provided, in the longitudinal direction of the substrate 1105, as illustrated in FIG. 3B.

The heater 1100 according to the first embodiment can form various heat-generating distributions by independently controlling the plurality of heat-generating blocks. Accordingly, a heat-generating distribution can be set in accordance with the size of the recording material P. Further, the heat-generating members 1102 are formed of a material having positive temperature coefficient (PTC) properties. Thus, high temperature at non-sheet-feeding portions can be maximally suppressed even in cases in which the ends of the recording material P and the boundaries of the heat-generating blocks do not match.

A surface protective layer 1108 which has slidability is provided at the sliding surface layer 2 on a sliding surface (face on side that comes into contact with the fixing film 25) side of the heater 1100. Glass is used for the surface protective layer 1108 in the present first embodiment. Providing this surface protective layer 1108 enables smooth sliding between the heater 1100 and the fixing film 25.

The heater holder 29 will be described with reference to FIG. 3C. The heater holder 29 according to the present embodiment is provided with opening portions HC11 to HC15, HC18-1, and HC18-2, to feed electric power to the electrodes E11 to E15, E18-1, and E18-2 that are formed on the back surface layer 1. The electric contacts C11 to C15, C18-1, and C18-2, feed electric power to the electrodes through these opening portions. Also provided to the heater holder 29 are opening portions H212-12, H212-13, and H212-15 for disposing thermal switches 520, and opening portions H213-12, H213-13, and H213-15 for disposing thermistors 510.

Thermistor

Next, the thermistor 510, which is a characteristic configuration of the first embodiment, will be described. The thermistor 510 is an example of a temperature-detecting element used by a temperature-detecting portion in a control configuration of the fixing apparatus C or the image forming apparatus in order to detect and to measure the temperature of the heater 1100. In particular, an object thereof is to perform desired temperature regulation control by reflecting the measurement results thereof in power application control of the heater 1100. The thermistor 510 is preferably disposed in at least one of the heat-generating blocks HB belonging to a heat-generating group that is fed electric power from the same drive, from the perspective of temperature regulation control.

Figures 5A, 5B:
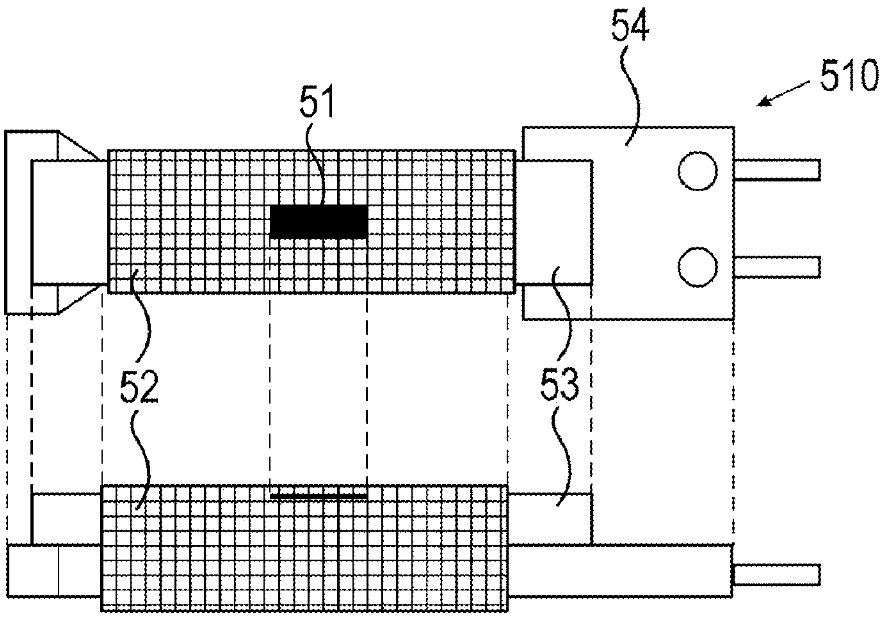
FIGS. 5A and 5B are schematic cross-sectional views of a thermistor according to the first embodiment.

The configuration of the thermistor 510 will be described with reference to FIGS. 5A and 5B. As illustrated in FIGS. 5A and 5B, the thermistor 510 is made up of a thermistor chip 51, an insulating film 52, an elastic member 53, and a heat-resistant member 54. The thermistor chip 51 that performs temperature detection has properties of the resistance value thereof changing depending on the temperature, and is an element that can detect the temperature by measuring the resistance value thereof. The insulating film 52, which is made of a material such as polyimide or the like, secures insulation of the thermistor chip 51 by covering around the thermistor chip 51. The elastic member 53 is disposed in order to satisfy stable contact of the thermistor chip 51 with the object of temperature detection, and ceramic paper or the like is used. The heat-resistant member 54 is made of a material having heat resistance, such as a liquid crystal polymer (LCP) or the like. The thermistor 510 is placed such that the insulating film 52 comes into contact with the face (surface protective layer 1107) of the heater 1100 on the opposite side from the face at which the nip portion N is formed with the pressure roller 26.

Power Application Control Circuit of Heater

Figure 4:
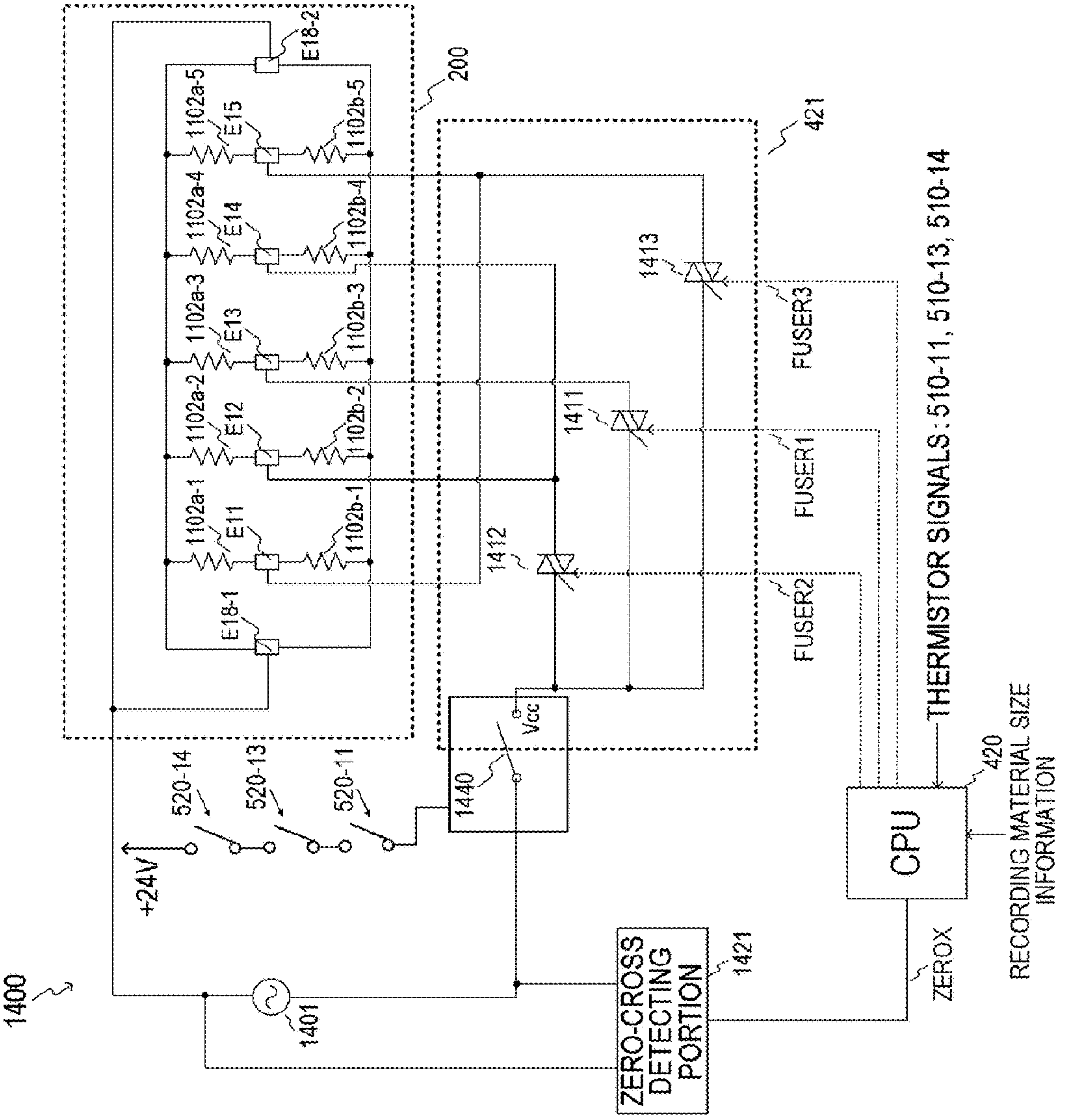
FIG. 4 is a circuit diagram of an electric circuit according to the first embodiment.

FIG. 4 is a circuit diagram of a control circuit 1400 that controls the heater 1100. Electric power control (power application control) regarding the heater 1100 is carried out by TRIACs 1411 to 1413 performing conduction/cutoff of electric power supply to the heater 1100. The TRIACs 1411 to 1413 each operate in accordance with FUSER1 to FUSER3 signals from the CPU 420. The control circuit 1400 of the heater 1100 has a circuit configuration enabling power application to the five heat-generating blocks HB11 to HB15 by the three TRIACs 1411 to 1413. Specifically, power application control of the heat-generating block HB13 (No. 1 heat-generating group) is performed by the TRIAC 1411. Also, power application control of the heat-generating blocks HB12 and HB14 (No. 2 heat-generating group) is performed by the TRIAC 1412, and power application control of the heat-generating blocks HB 11 and HB15 (No. 3 heat-generating group) is performed by the TRIAC 1413. At this time, The No. 2 heat-generating group serving as a first heat-generating member group, and the No. 3 heat-generating group serving as a second heat-generating member group each has a plurality of heat-generating blocks HB for one drive circuit. That is to say, electric power is supplied to each of the heat-generating members included in the groups, via one common drive circuit each (first common circuit, second common circuit). Note that the drive circuits of the TRIACs 1411 to 1413 are omitted from illustration in FIG. 4.

A zero-cross detecting portion 1421 is a circuit that detects zero-cross of an AC power source 1401, and outputs ZeroX signals to the CPU 420. The ZeroX signals are used as reference signals for phase control of the TRIACs 1411 to 1413 and so forth.

A relay 1440 is provided as member for cutoff of electric power to the heater 1100 in a case of the heater 1100 overheating due to malfunctioning of the apparatus or the like. Three thermal switches 520-11, 520-13, and 520-14 are on a DC circuit connected to a 24 V power source. A configuration is made such that when any one of the three thermal switches 520-11, 520-13, and 520-14 opens, the 24

V applied to the relay 1440 is cut off and the relay 1440 opens, thereby cutting off the AC circuit. Note that while a case of using thermal switches is described in the present embodiment as an example of a safety element, temperature fuses or other elements that operate to detect abnormal heating of the heater and to cut off supply of electric power to the heater may be used.

Disposing Positions of Thermistors and Thermal Switches According to Comparative Example 1

Figure 7:
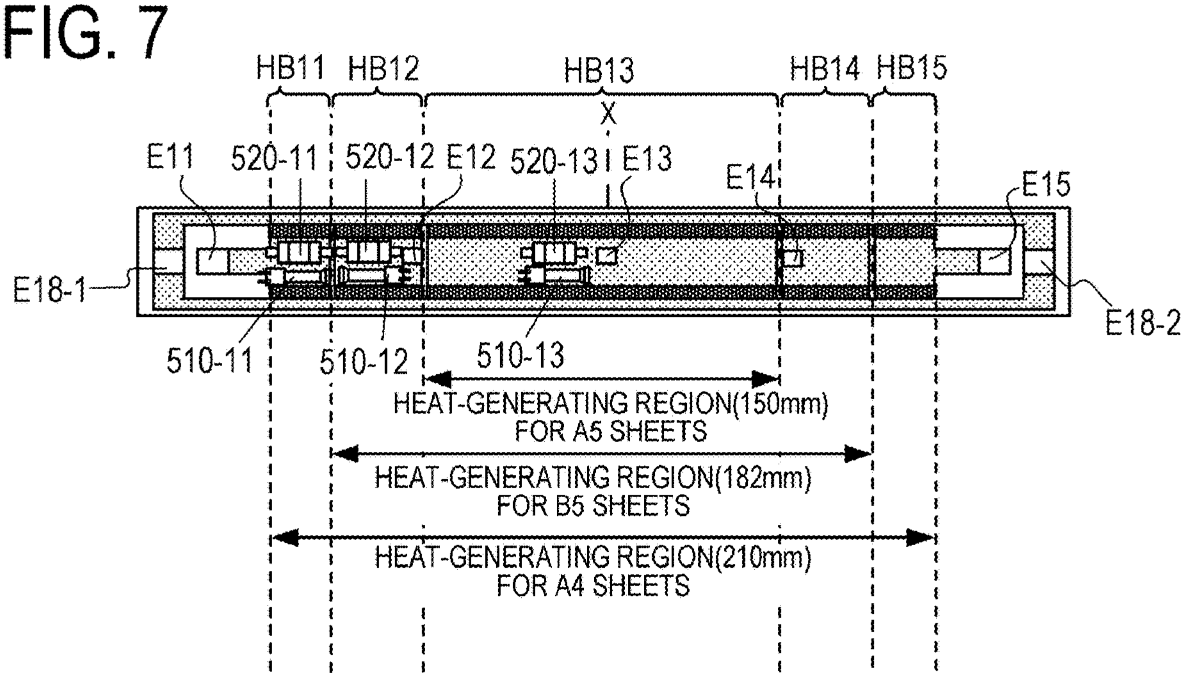
FIG. 7 is a schematic plan view of a heater and thermistors according to Comparative Example 1.

FIG. 7 is a schematic plan view illustrating disposing positions of the thermistors 510 and the thermal switches 520 according to Comparative Example 1. As illustrated in FIG. 7, regarding the thermistors 510 of Comparative Example 1, thermistors 510-11, 510-12, and 510-13 are respectively disposed in the heat-generating block HB11, the heat-generating block HB12, and the heat-generating block HB13. In Comparative Example 1, the three of the thermistors 510-11, 510-12, and 510-13 perform temperature regulation control. Regarding the thermal switches 520, thermal switches 520-11, 520-12, and 520-13 are respectively disposed in the heat-generating block HB11, the heat-generating block HB12, and the heat-generating block HB13. That is to say, the fixing apparatus according to Comparative Example 1 is configured such that the thermistors 510-11, 510-12, and 510-13 are disposed one-sidedly in the heat-generating blocks HB, on the same side of right or left as to the center of the recording material in the width direction (on one side of either right or left).

Problems with Comparative Example 1

The fixing apparatus according to Comparative Example 1 is configured with the thermistors disposed on one side of right or left as to the center of the sheet (one-sidedly on one side of either right or left), and accordingly, when there is variance in resistance values of the heater 1100, lateral difference of fixability may become great. As a result, there is a possibility of faulty images due to fixability, such as faulty fixing, hot offset, or the like, occurring. A conceivable measure to solve this problem is to improve product quality so that the variance of resistance distribution of the heater is suppressed to be within a predetermined range, for example, but this would inevitably lead to increased costs such as selection and management of heaters, and so forth, in order to satisfy quality to serve as an image forming apparatus.

Resistance Variance of Heater

Resistance variance of the heat-generating members will be described with reference to FIGS. 8A and 8C. Resistance variance in the heat-generating members tends to have a uniform resistance distribution in the longitudinal direction, due to the manufacturing method thereof. As an example of resistance distribution of a heater with great resistance non-uniformity, FIG. 8A shows resistance distribution (resistance non-uniformity) of the heat-generating members 1102 of a heater AH, and FIG. 8C shows resistance distribution (resistance non-uniformity) of the heat-generating members 1102 of a heater BH.

Figure 8A:
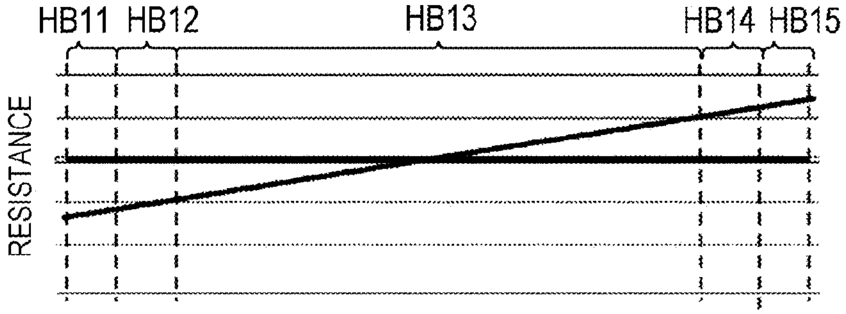
FIGS. 8A to 8D are longitudinal distribution diagrams of resistance values and heat-generating member temperatures of the heater according to Comparative Example 1.

As shown in FIG. 8A, the resistance values of the heat-generating members of the heater AH change continuously in the longitudinal direction, with the resistance at the right side in FIG. 8A being high. That is to say, this is a resistance distribution with inclination (heavy solid line extending obliquely in FIG. 8A) as to a resistance distribution that is uniform in the longitudinal direction when there is no resistance non-uniformity (heavy solid line extending horizontally in FIG. 8A). In a case of using such a heater and supplying electric power to the heat-generating blocks HB of the same heat-generating group, the heat-generating members with the lower resistance value will generate a greater amount of heat, since the heat-generating members are connected in parallel to the electrodes. Specifically, the heat generation amount of the heat-generating block HB12 will be greater than that of the heat-generating block HB14, and the heat generation amount of the heat-generating block HB11 will be greater than that of the heat-generating block HB15.

Figure 8B:
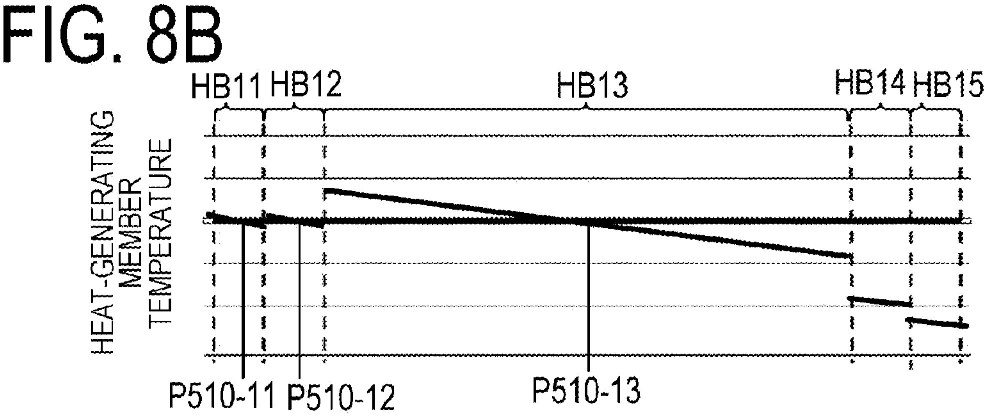
Figure 8C:
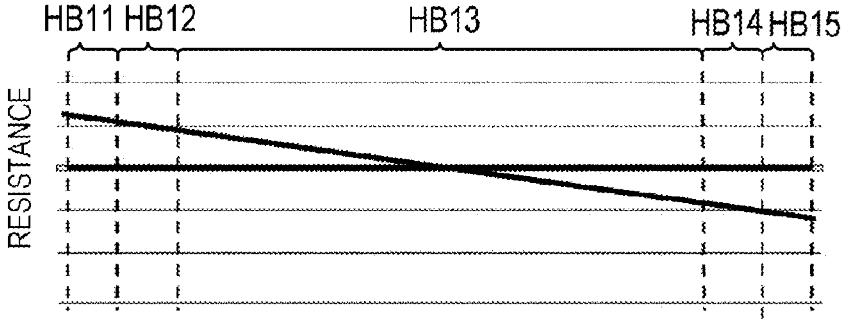

As illustrated in FIG. 8C, the resistance values of the heat-generating members of the heater BH change continuously in the opposite direction as to those of the heater AH. That is to say, the resistance at the right side in FIG. 8C is low. As a result, in a case of using the heater BH, the heat generation amount of the heat-generating block HB12 will be smaller than that of the heat-generating block HB14, and the heat generation amount of the heat-generating block HB11 will be smaller than that of the heat-generating block HB15.

As described above, the heat-generating members 1102 of the heater 1100 tend to have a uniform resistance distribution in the longitudinal direction, due to the manufacturing method thereof. The heat-generating members 1102 are formed on the substrate 1105 made of a ceramic by a technology such as screen printing or the like. When transferring the heat-generating members 1102 onto the substrate 1105 in screen printing, the coating amount of heat-generating member 1102 is decided by moving a squeegee along the longitudinal direction of the heater 1100. In a case of forming the heat-generating members 1102 by screen printing in this way, non-uniformity in thickness of the heat-generating members 1102 occurs in the screen printing direction, i.e., in the longitudinal direction of the heater 1100, and as a result, resistance non-uniformity tends to readily occur.

Temperature Regulation Control of Comparative Example 1

Figure 8D:
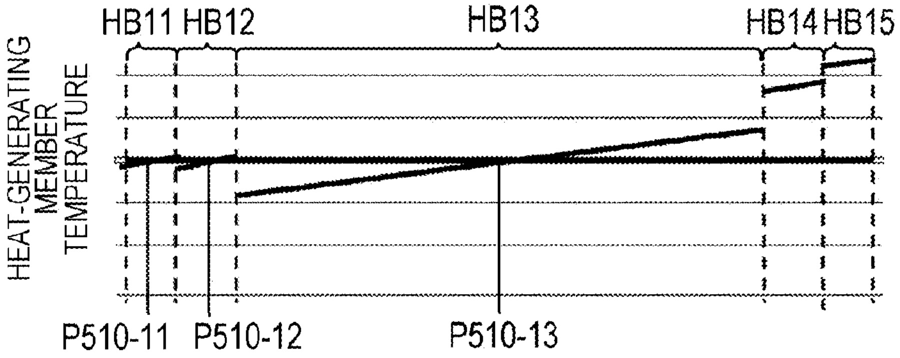

FIGS. 8B and 8D show temperature regulation control of the fixing unit according to Comparative Example 1 in a case of using the above heaters AH and BH. FIGS. 8B and 8D show temperature distribution of the heat-generating members in a case of performing temperature regulation control using the thermistors 510-11, 510-12, and 510-13 in the fixing apparatus of the Comparative Example illustrated in FIG. 7. FIG. 8B shows the temperature distribution of the heat-generating members in a case of performing temperature regulation control using the heater AH, and FIG. 8D shows the temperature distribution of the heat-generating members in a case of using the heater BH. Temperature regulation is performed using the thermistors 510-11, 510-12, and 510-13 in Comparative Example 1, and accordingly the temperature of the heater 1100 is regulated to a predetermined temperature at the disposing positions of the thermistors, which are P510-11, P510-12, and P510-13.

In a case of using the heater AH, the resistance values of the heat-generating members 1102 in the region of the heat-generating block HB11 and the heat-generating block HB12 are lower than the resistance values in the heat-generating block HB14 and the heat-generating block HB15. As a result, as shown in FIG. 8B, the heat-generating member temperatures in the heat-generating block HB14 and the heat-generating block HB15 become lower than the heat-generating member temperatures in other regions. That is to say, in a case of using the heater AH, temperature regulation is performed to the predetermined temperature at the disposing position (P510-11) of the thermistor 510-11, since the thermistor 510-11 is disposed in the heat-generating block HB11. Also, temperature regulation is performed to the predetermined temperature at P510-12 in the same way, since the thermistor 510-12 is disposed in the heat-generating block HB12. Meanwhile, in the heat-generating block HB14 and the heat-generating block HB15, the resistance value of the heat-generating members is high and the amount of generated heat is small, and moreover, temperature regulation is performed at the heat-generating block HB12 and the heat-generating block HB11, and accordingly the temperatures of the heat-generating members fall even further. As a result, there is a possibility that a sufficient amount of heat necessary for fixing will not be supplied, and that faulty fixing will occur.

Conversely, in a case of using the heater BH, the resistance values of the heat-generating members 1102 in the region of the heat-generating block HB11 and the heat-generating block HB12 are higher than the resistance values in the heat-generating block HB14 and the heat-generating block HB15. Accordingly, in a case of using the heater BH, the heat-generating member temperatures in the heat-generating block HB14 and the heat-generating block HB15 become higher than the heat-generating member temperatures in other regions, as a result of performing temperature regulation control at the thermistors 510-11 and 510-12, as shown in FIG. 8D. Consequently, the heat for fixing becomes excessive, and there is a possibility of hot offset occurring.

Film Surface Temperature in Comparative Example 1

Figure 10A:
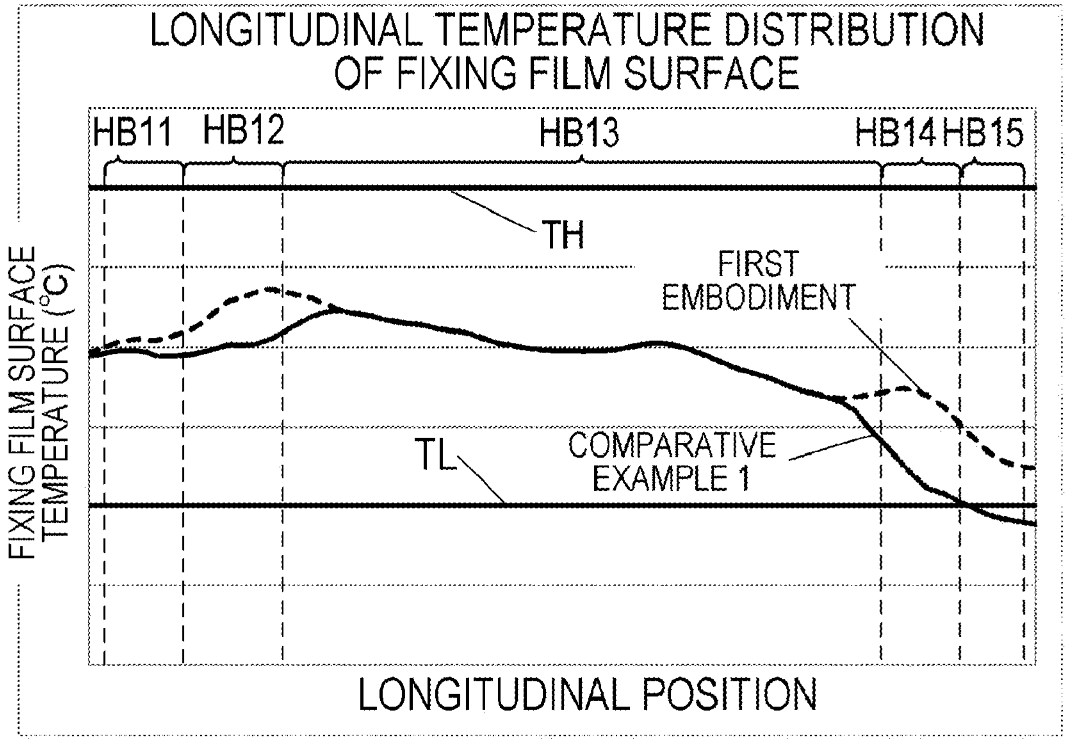
FIGS. 10A and 10B are longitudinal temperature distribution diagrams of a surface of a fixing film according to the first embodiment.
Figure 10B:
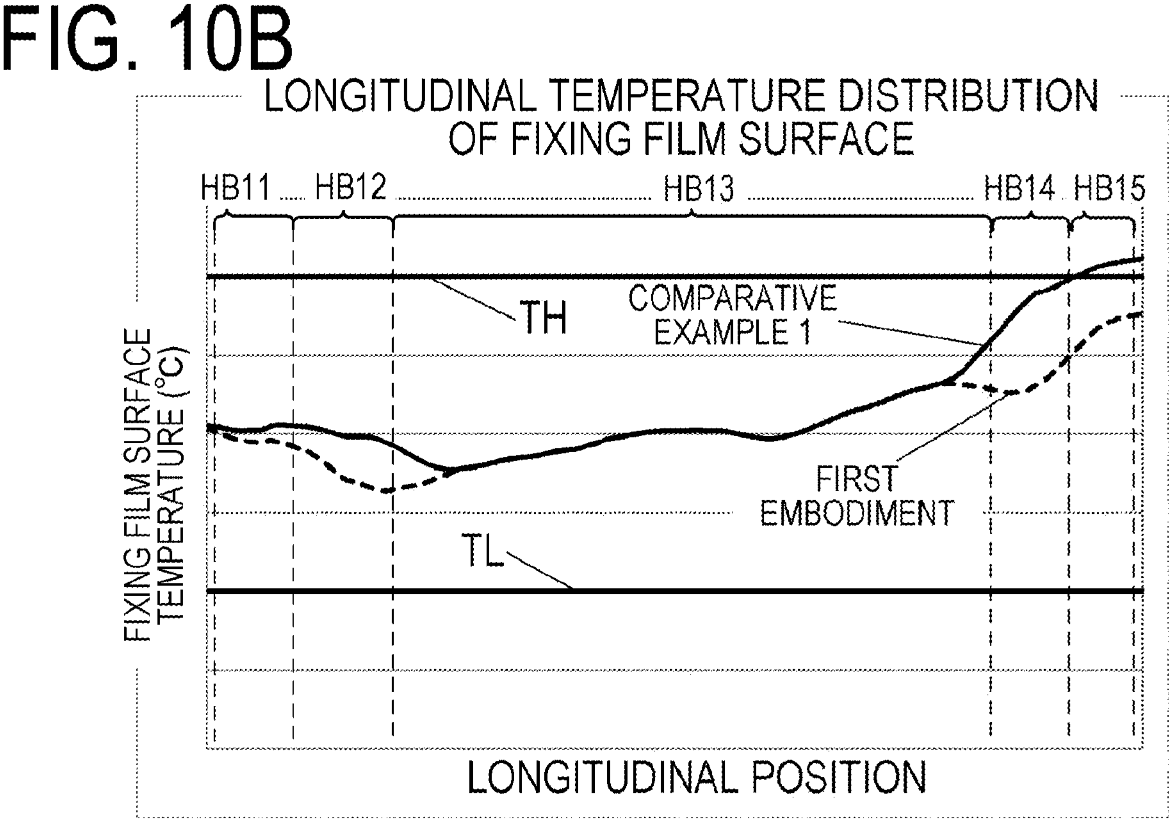

Next, longitudinal temperature distribution on the surface of the fixing film 25 according to Comparative Example 1 will be described with reference to FIGS. 10A and 10B. The longitudinal temperature distribution on the surface of the fixing film 25 is characterized in having a smooth temperature change as compared to the longitudinal temperature distribution of the heat-generating members 1102. The reason is that the thermal conductivity in the longitudinal direction of the heater 1100 and the fixing film 25 is high in comparison with the thermal conductivity of the fixing film 25 in the thickness direction thereof. That is to say, this is because heat is supplied in the longitudinal direction when heat from the heat-generating members 1102 is transmitted in the thickness direction of the substrate 1105 of the heater 1100 and the fixing film 25. Note that a temperature TL shown in FIGS. 10A and 10B is a threshold value temperature for faulty fixing, and a temperature TH is a threshold value temperature for hot offset. When the surface temperature of the fixing film 25 falls below the temperature TL, faulty fixing occurs, and when the surface temperature exceeds the temperature TH, hot offset occurs.

The longitudinal temperature distribution on the surface of the fixing film 25 in a case of performing temperature regulation with the fixing apparatus according to Comparative Example 1 using the heater AH is shown by a solid line in FIG. 10A. The longitudinal temperature distribution of the heat-generating members 1102 according to Comparative Example 1 is such that the temperature is lower at both the heat-generating block HB14 and the heat-generating block HB15, in comparison with FIG. 8B. As a result, supply of heat in the longitudinal direction is not performed in the region of the heat-generating block HB15, and the surface temperature of the fixing film 25 becomes low in the region of the heat-generating block HB15. As a result, the surface temperature of the fixing film 25 falls below the temperature TL that is the threshold value temperature for faulty fixing, and faulty fixing occurs.

Conversely, the longitudinal temperature distribution on the surface of the fixing film 25 in a case of performing temperature regulation with the fixing apparatus according to Comparative Example 1 using the heater BH is conceptually shown by a solid line in FIG. 10B. The longitudinal temperature distribution of the heat-generating members 1102 according to Comparative Example 1 is such that the temperature is higher at both the heat-generating block HB14 and the heat-generating block HB15, in comparison with FIG. 8D. As a result, heat that is excessively supplied to the region of the heat-generating block HB15 is not able to be shunted to other heat-generating blocks HB, and the surface temperature of the fixing film 25 becomes high at the region of the heat-generating block HB15. As a result, the surface temperature of the fixing film 25 exceeds the temperature TH that is the threshold value temperature for hot offset, and hot offset occurs.

As described above, in a case of using the heater 1100 having resistance distributions such as the heater AH or the heater BH in the fixing apparatus according to Comparative Example 1, there is a possibility of faulty fixing or hot offset occurring.

Figure 6:
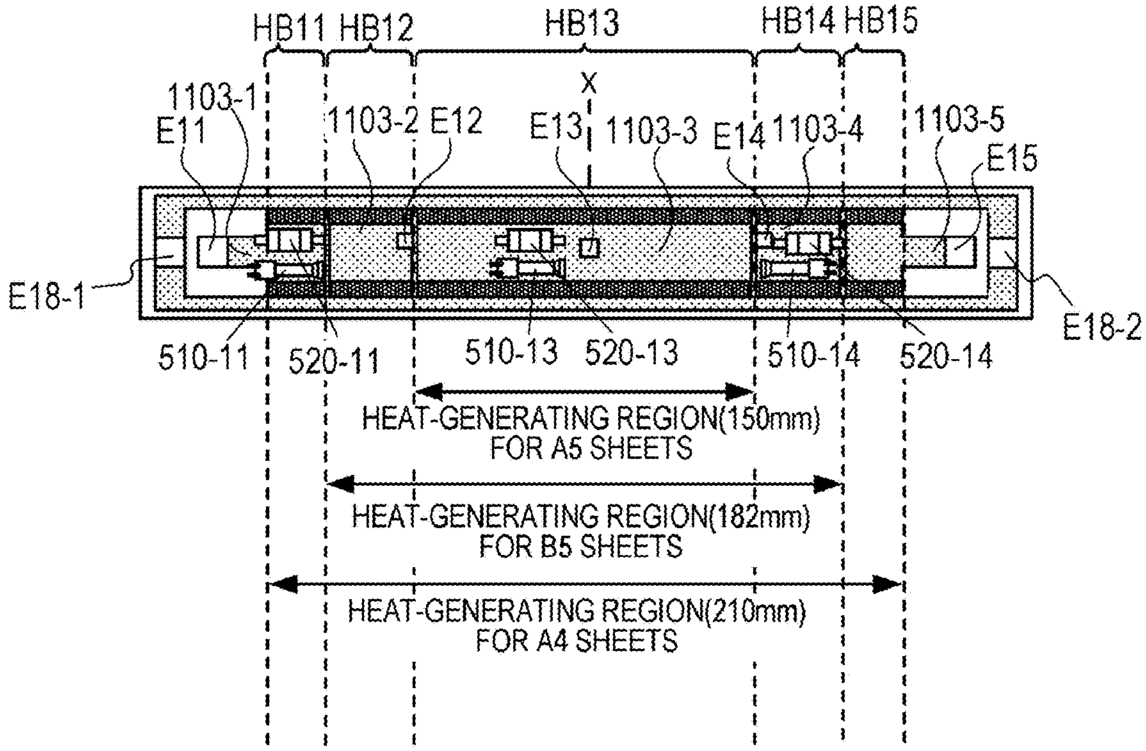
FIG. 6 is a schematic plan view of the heater and the thermistors according to the first embodiment.

Disposing Positions of Thermistors and Thermal Switches According to First Embodiment In contrast, the problems of Comparative Example 1 can be solved by using the fixing apparatus according to the present first embodiment. The disposing positions of the thermistors 510 and the thermal switches 520 according to the first embodiment are illustrated in FIG. 6. As illustrated in FIG. 6, the thermistors 510-11, 510-13, and 510-14 are respectively disposed in the heat-generating block HB11, the heat-generating block HB13, and the heat-generating block HB14 in the first embodiment. That is to say, the thermistor 510-11 serving as a second temperature-detecting element is placed to the left side (other side) as to the conveyance reference position X, to detect the temperature of the heat-generating block HB11 out of the No. 3 heat-generating group serving as the second heat-generating member group (heat-generating blocks HB11 and HB15). Also, the thermistor 510-14 serving as a first temperature-detecting element is placed to the right side (one side) as to the conveyance reference position X, to detect the temperature of the heat-generating block HB14 out of the No. 2 heat-generating group serving as the first heat-generating member group (heat-generating blocks HB12 and HB14). Temperature regulation control is performed by the three of the thermistors 510-11, 510-13, and 510-14 in the first embodiment. That is to say, temperature regulation control is performed such that temperatures detected by the thermistors 510-11, 510-13, and 510-14 are maintained at a predetermined control targe temperature. Regarding the thermal switches, the thermal switches 520-11, 520-13, and 520-14 are respectively disposed in the heat-generating block HB11, the heat-generating block HB13, and the heat-generating block HB14. That is to say, the thermal switch 520-11 serving as a second safety element is placed corresponding to the heat-generating block HB11 out of the heat-generating blocks included in the No. 3 heat-generating group, in which the thermistor 510-11 is correspondingly placed. Also, the thermal switch 520-14 serving as a first safety element is placed corresponding to the heat-generating block HB14 out of the heat-generating blocks included in the No. 2 heat-generating group, in which the thermistor 510-14 is correspondingly placed.

Temperature Regulation Control According to First Embodiment

Figure 9A:
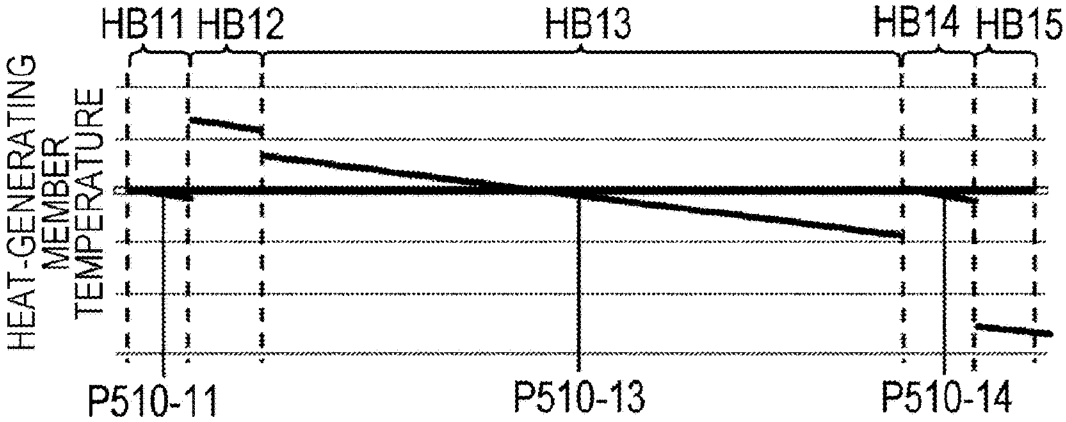
FIGS. 9A and 9B are longitudinal distribution diagrams of resistance values and heat-generating member temperatures of the heater according to the first embodiment.

FIG. 9A shows a temperature distribution of the heat-generating members 1102 in a case of using the heater 1100 having the resistance distribution shown in FIG. 8A to perform thermistor temperature regulation in the present first embodiment. Temperature regulation is performed using the thermistors 510-11, 510-13, and 510-14 in the present first embodiment, and accordingly temperature regulation to the predetermined temperature is performed at the disposing positions of the thermistors illustrated in FIG. 6, which are P510-11, P510-13, and P510-14.

Figure 9B:
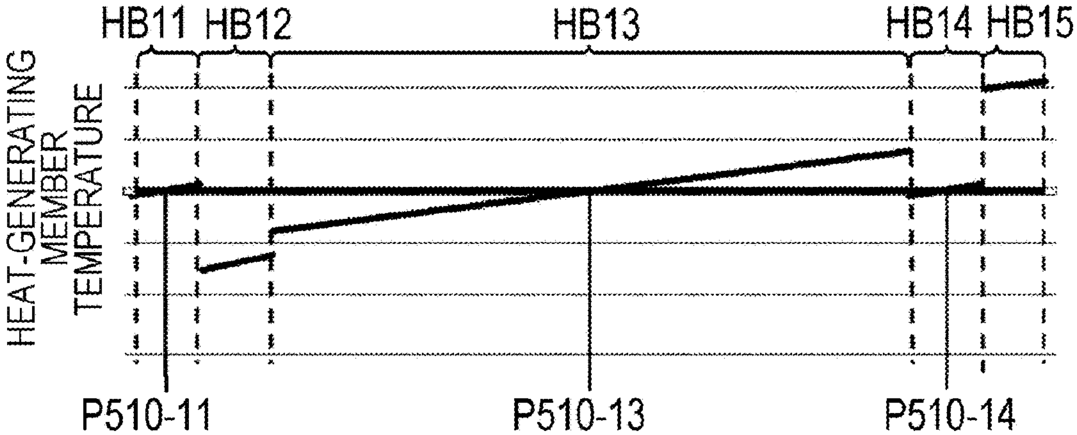

A point of difference as to the temperature of the heat-generating members 1102 in Comparative Example 1 is the point of difference between FIG. 8B and FIG. 9A, and between FIG. 8D and FIG. 9B, i.e., the difference in temperature in the regions of the heat-generating block HB12 and the heat-generating block HB14. In the present first embodiment, temperature regulation is performed by the thermistor 510-14 disposed in the heat-generating block HB14, and accordingly the temperature of the heat-generating block HB14 is regulated to the predetermined temperature. Meanwhile, in comparison with the temperature of the heat-generating member 1102 of the heat-generating block HB14, the temperature of the heat-generating member 1102 in the heat-generating block HB12 is higher in a case of using the heater AH, and is lower in a case of using the heater BH. Other regions are the same temperature in both Comparative Example 1 and the present first embodiment.

Film Surface Temperature of First Embodiment

The longitudinal temperature distribution of the surface of the fixing film 25 according to the present first embodiment will be described with reference to FIGS. 10A and 10B.

The longitudinal temperature distribution of the surface of the fixing film 25 in a case of performing temperature regulation with the fixing apparatus according to the first embodiment using the heater AH is shown by a dotted line in FIG. 10A. As showing in FIG. 10A, the surface temperature of the fixing film 25 in the regions of the heat-generating block HB14 and the heat-generating block HB15 according to the first embodiment is higher than the surface temperature of the fixing film 25 in the same regions according to Comparative Example 1. This is because temperature regulation is performed by the thermistor 510-14 disposed in the heat-generating block HB14 in the first embodiment, and accordingly the temperature of the heat-generating member 1102 in the heat-generating block HB14 is higher as compared with Comparative Example 1, and this heat is also passed on to the region of the heat-generating block HB15. Consequently, in the present first embodiment, the surface temperature of the fixing film exceeds the temperature TL in the region of the heat-generating block HB15 as well, unlike in Comparative Example 1, and accordingly faulty fixing does not occur. As described above, occurrence of faulty fixing can be suppressed in a case of using the heater AH, by using the present first embodiment.

Conversely, the longitudinal temperature distribution of the surface of the fixing film 25 in a case of performing temperature regulation with the fixing apparatus according to the first embodiment using the heater BH is conceptually shown by a dotted line in FIG. 10B. As showing in FIG. 10B, the surface temperature of the fixing film 25 in the regions of the heat-generating block HB14 and the heat-generating block HB15 according to the first embodiment is lower than the surface temperature of the fixing film 25 in the same regions according to Comparative Example 1. This is because temperature regulation is performed by the thermistor 510-14 disposed in the heat-generating block HB14 in the first embodiment, and accordingly the temperature of the heat-generating member 1102 in the heat-generating block HB14 is lower as compared with Comparative Example 1, and the heat of the heat-generating block HB15 is also passed on to the region of the heat-generating block HB14. Consequently, in the present first embodiment, the surface temperature of the fixing film is below the temperature TH in the region of the heat-generating block HB15 as well, unlike in Comparative Example 1, and accordingly hot offset does not occur. As described above, occurrence of hot offset can be suppressed in a case of using the heater BH as well, according to the present first embodiment.

As described above, operational effects not obtainable by the Comparative Example can be exhibited by using the fixing apparatus according to the first embodiment.

Note that while the positions of disposing the thermistors 510 is the three of the heat-generating blocks HB11, HB13, and HB14 in the present first embodiment, this is not limiting, as long as the thermistors 510 are disposed in heat-generating groups including a plurality of heat-generating blocks HB without being adjacent to each other. For example, the positions of disposing the thermistors 510 may be the heat-generating blocks HB12, HB13, and HB15.

Also, while description has been made regarding the present first embodiment by way of an example of the heater 1100 in which the heat-generating members 1102*a* and 1102*b* are provided in the conveying direction of the recording material P, the form of the heat-generating members is not limited, as long as the heat-generating blocks HB are divided in the width direction of the recording material P in the heater 1100. Also, a configuration has been shown in the present first embodiment in which the electrodes E11 to E15, E18-1, and E18-2 are formed on the rear face of the recording material passage region of the heater 1100, this is not limiting.

Figure 11A:
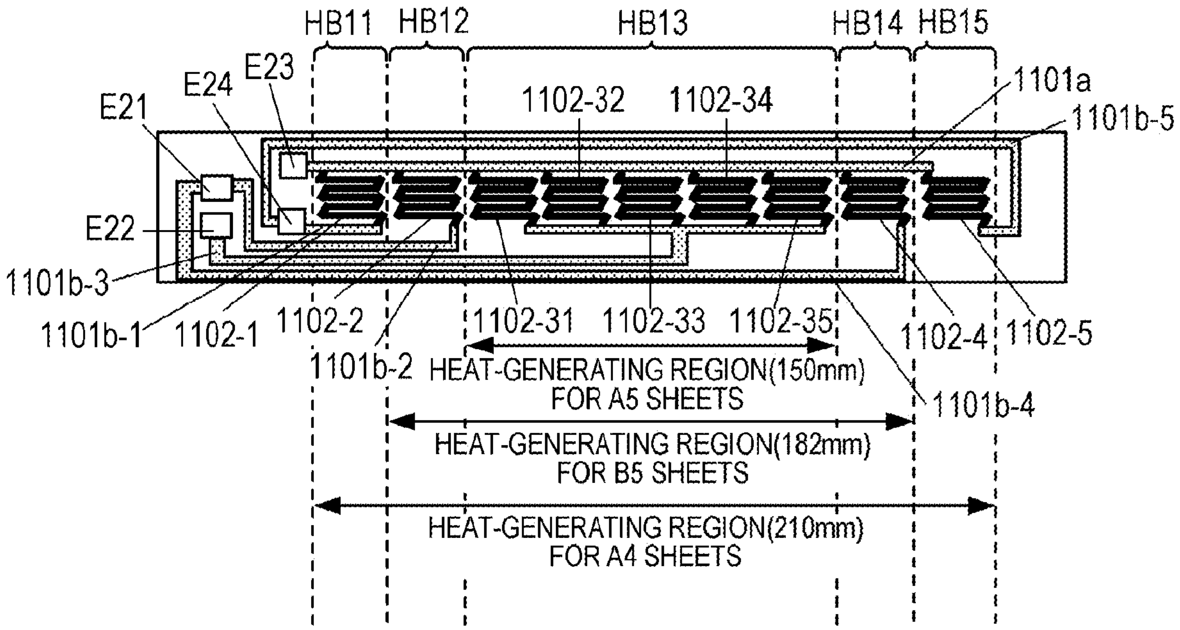
FIGS. 11A and 11B are schematic plan views of the heater according to the first embodiment.
Figure 11B:
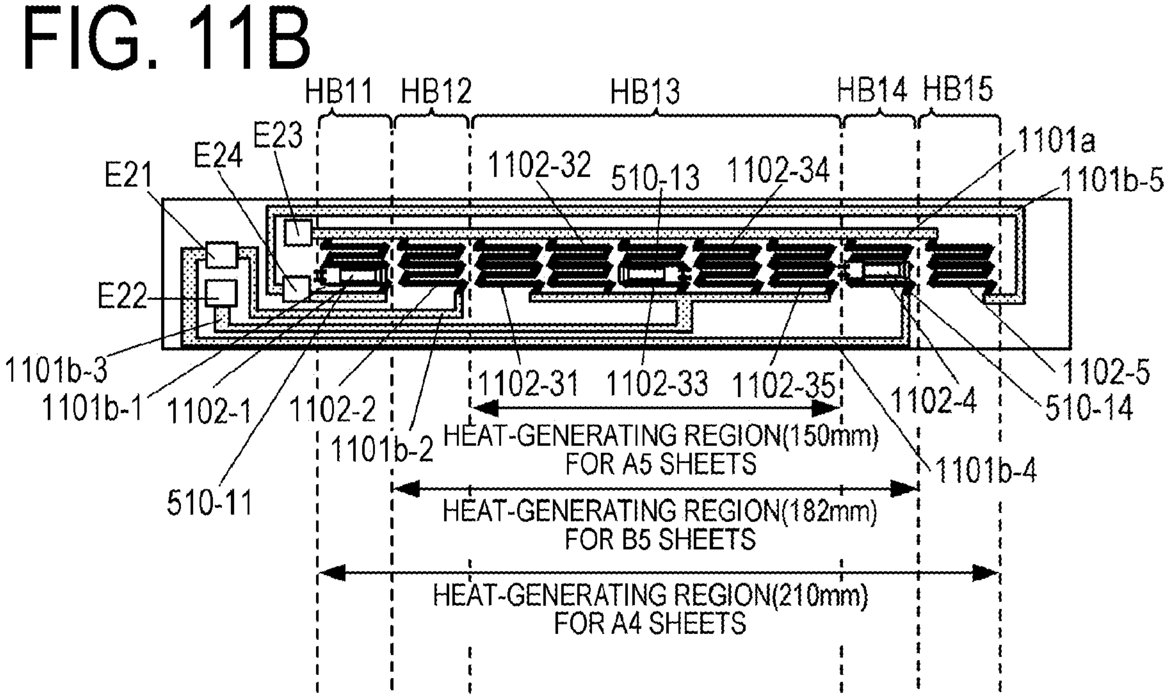

An example of the above-described configuration is illustrated in FIGS. 11A and 11B. The heater 1100 in FIG. 11A is divided into the five of heat-generating members 1102-1 to 1102-5, and the heat-generating region is divided into the five of heat-generating blocks HB11 to HB15. The heat-generating blocks HB are grouped into three heat-generating groups of the No. 1 heat-generating group (heat-generating block HB13), the No. 2 heat-generating group (heat-generating blocks HB12 and HB14), and the No. 3 heat-generating group (heat-generating blocks HB11 and HB15), in accordance with respective drive circuits. The No. 1 heat-generating group is a heat-generating region that includes the conveyance reference position X of the recording material P. The No. 2 heat-generating group is a heat-generating region that has the heat-generating blocks HB divided to the right and left across the conveyance reference position X of the recording material P, and is disposed adjacent to the No. 1 heat-generating group on the sides thereof away from the conveyance reference position X of the recording material P. The No. 3 heat-generating group is a heat-generating region that has the heat-generating blocks HB divided to the right and left across the conveyance reference position X of the recording material P, and is disposed adjacent to the No. 2 heat-generating group on the sides thereof away from the conveyance reference position X of the recording material P.

Now, the heat-generating members 1102-1 to 1102-5 have forms that are folded a plurality of times in the width direction of the heater 1100, as illustrated in FIG. 11A. Also, the heat-generating members 1102-1 to 1102-5 receive supply of electric power from electrodes E21 to E24 through the conductors 1101*a*, and 1101*b*-1 to 1101*b*-5, and generate heat. The thermistors 510 are disposed at positions illustrated in FIG. 11B with respect to the heater 1100. That is to say, the thermistor 510-11 is disposed in the region of the heat-generating block HB11, the thermistor 510-13 in the region of the heat-generating block HB13, and the thermistor 510-14 in the region of the heat-generating block HB14. Thus, the effects of the present embodiment can be exhibited. Note that the thermistors may be disposed in the heat-generating blocks HB12, HB13, and HB15 in this case as well, in the same way.

Figure 12:
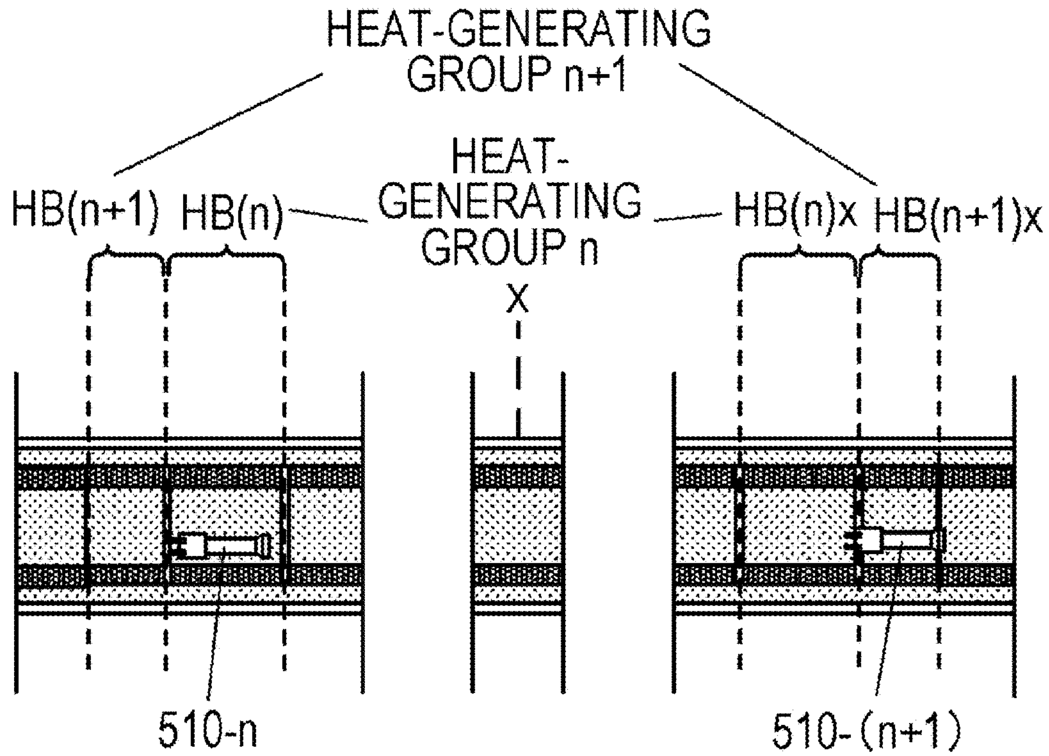
FIG. 12 is a schematic plan view of the heater according to the first embodiment.

Further, while a case has been described in the present embodiment in which the heat-generating groups are three, the same advantages can be exhibited in a fixing apparatus in which the heat-generating region is divided into a greater number. An example is illustrated in FIG. 12. As illustrated in FIG. 12, a heat-generating group (n) is made up of heat-generating blocks HB(n) and HB(n)x to which electric power is supplied by the same drive, the heat-generating blocks HB(n) and HB(n)x being laid out divided to the right and left across the conveyance reference position X of the recording material P. Also, a heat-generating group (n+1) is made up of heat-generating blocks HB(n+1) and HB(n+1)x to which electric power is supplied by the same drive, the heat-generating blocks HB(n+1) and HB(n+1)x being laid out divided to the right and left across the conveyance reference position X of the recording material P. Also, the heat-generating group (n+1) is disposed adjacent to the heat-generating group (n) on the sides thereof away from the conveyance reference position X of the recording material P. The thermistors 510 here are disposed at the positions illustrated in FIG. 12. That is to say, a thermistor 510-(n) is disposed in the heat-generating block HB(n), and a thermistor 510-(n+1) is disposed in the heat-generating block HB(n+1)x. Accordingly, good fixing performance can be satisfied regardless of longitudinal variance in heater resistance, even in a fixing apparatus using a heater 1100 that is divided into a greater number of divisions.

Further, although the thermistor 510 is placed with the insulating film 52 thereof in contact with the heater 1100 in the present first embodiment, the position of placement is not limited in particular as long as the thermistor chip 51 is capable of detecting the temperature of the region of this heat-generating block HB.

Also, although a configuration is made in the present first embodiment in which the thermistors 510 and the thermal switches 520 are disposed in the same heat-generating blocks HB, these may be disposed in different heat-generating blocks HB under the same drive, from the perspective of conserving space. For example, a configuration may be made in which the thermistors 510 are disposed in the heat-generating block HB11 and the heat-generating block HB14, and the thermal switches 520 are disposed in the heat-generating block HB12 and the heat-generating block HB15. According to this layout, the thermistors 510 and the thermal switches 520 can be efficiently disposed. As a result, the size and costs of the heater 1100 can be reduced.

Second Embodiment

In a second embodiment, description will be made regarding the configuration of a fixing apparatus applied in a case in which the longitudinal resistance distribution of the heater 1100 is great, and the fixing apparatus has unit for detecting the resistance distribution thereof. The difference between the second embodiment and the first embodiment is only the resistance distribution of the heater 1100 and the detecting unit for detecting the resistance distribution, and the control method thereof. Other configurations are the same as in the first embodiment, and accordingly repetitive description will be omitted. Items not described in particular here in the second embodiment are the same as in the first embodiment.

Resistance Variance of Heater of Second Embodiment

Figure 13A:
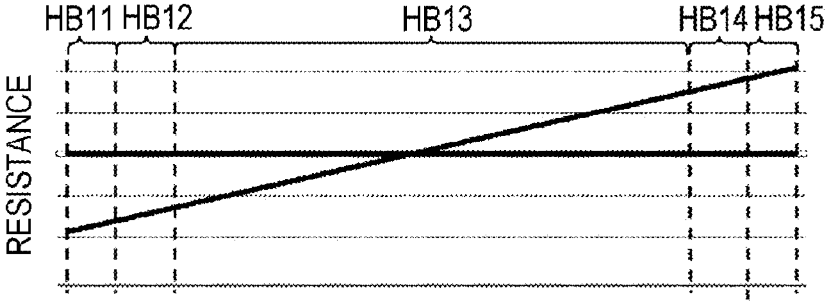
FIGS. 13A to 13D are longitudinal distribution diagrams of resistance values and heat-generating member temperatures of a heater according to a second embodiment.
Figure 13B:
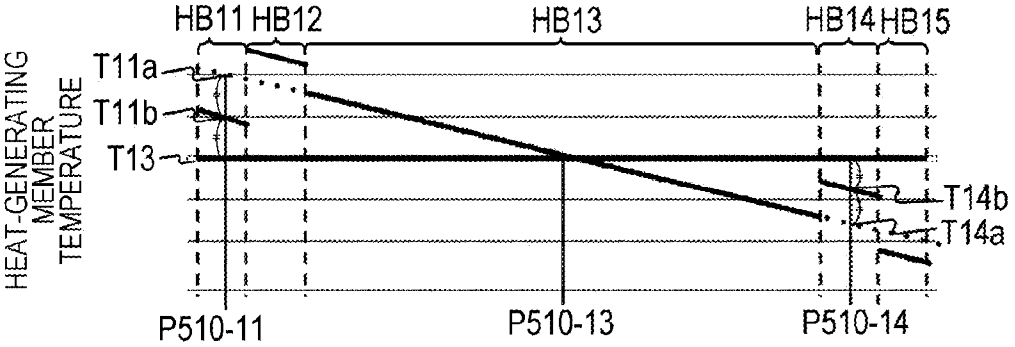
Figure 13C:
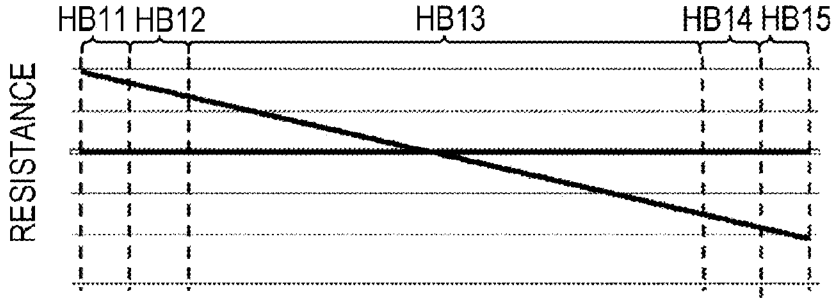

FIGS. 13A and 13C show resistance non-uniformity of heat-generating members 1102 of a "heater CH" and a "heater DH" that are representative of a heater 1100 with great resistance non-uniformity used in the second embodiment. FIG. 13A shows resistance non-uniformity of the "heater CH", and FIG. 13C shows resistance non-uniformity of the "heater DH". The resistance value of the heater CH is higher the farther to the right, while the resistance value of the heater DH is lower the farther to the right, and the respective resistance distributions are greater than those of the heater AH and the heater BH in the first embodiment.

Next, the detecting unit for detecting heater resistance in the second embodiment will be described. In the fixing apparatus according to the second embodiment, the resistance value distribution of the heat-generating members 1102 measured in advance at the time of manufacturing the heater 1100 is stored in storage unit such as fixing memory or the like.

Although means for measuring the resistance value distribution of the heat-generating members 1102 in advance has been shown here in the second embodiment as the detecting unit (acquisition portion) for detecting resistance distribution, other means may be used. For example, means for comparing thermistor temperatures at the time of startup, or means for comparing input electric power at the time of temperature regulation or the like, may be used.

Figure 13D:
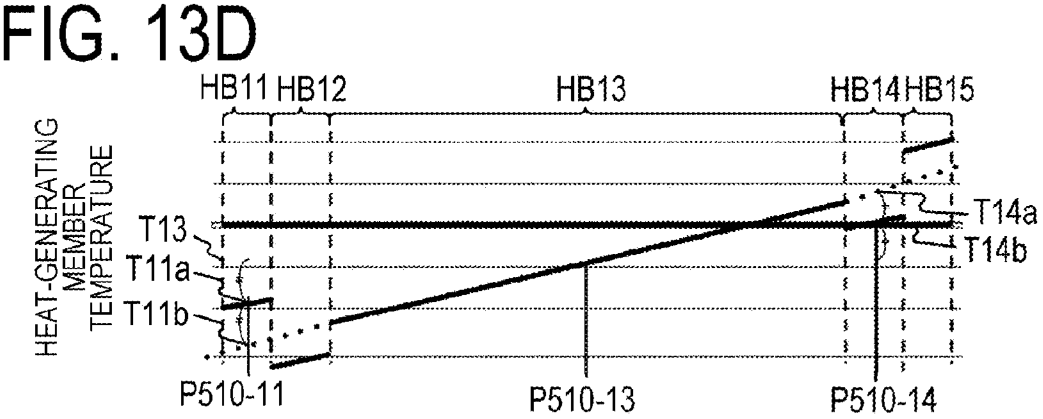

Fixing control according to the second embodiment will be described with reference to FIGS. 13B and 13D. In the fixing apparatus according to the second embodiment, temperature regulating means in a case of using the heater CH is shown in FIG. 13B, and temperature regulating means in a case of using the heater DH is shown in FIG. 13D.

In a case of using the heater CH, the temperature regulation temperature of the thermistor 510-11 is set to be higher than that of the thermistor 510-13, and the temperature regulation temperature of the thermistor 510-14 is set to be lower than that of the thermistor 510-13, as shown in FIG. 13B. Setting values of the temperature regulation temperature are preferably set such that the temperature difference between the heat-generating block HB11 and the heat-generating block HB12, and the temperature difference between the heat-generating block HB14 and the heat-generating block HB15, predicted from the resistance distribution of the heat-generating members 1102, do not exceed a predetermined value.

In the second embodiment, the temperature regulation temperature of the thermistor 510-11 and the thermistor 510-14 are decided according to the following procedures. Heater resistance distribution data stored in the fixing memory is used to calculate predicted values of the temperature of the heat-generating members 1102 when the same electric power is input to all of the Nos. 1 to 3 heat-generating groups (shown by dotted lines in FIG. 13B). A predicted value T11*a* of the temperature of the heat-generating member 1102 at P510-11 at this time and a temperature regulation temperature T13 at P510-13 are averaged to calculate T11*b*. The difference between the predicted value T11*a* and T11*b* here is the same as the difference between T11*b* and the temperature regulation temperature T13. This T11*b* is set to the temperature regulation temperature (control target temperature) of the thermistor 510-11. In the same way for the thermistor 510-14, a predicted value T14*a* of the temperature of the heat-generating member 1102 at P510-14 and the temperature regulation temperature T13 at P510-13 are averaged to calculate T14*b*. The difference between the predicted value T14*a* and T14*b* at this time is the same as the difference between T14*b* and the temperature regulation temperature T13. This temperature T14*b* is set to the temperature regulation temperature (control target temperature) of the thermistor 510-14.

Further, the temperature regulation temperatures of the thermistor 510-11 and the thermistor 510-14 are decided using the above-described procedures in a case of using the heater DH as well, in the same way as using the heater CH. In the case of using the heater DH, the temperature regulation temperature of the thermistor 510-11 is set lower than that of the thermistor 510-13, and the temperature regulation temperature of the thermistor 510-14 is set higher than that of the thermistor 510-13, as shown in FIG. 13D.

Figure 14A:
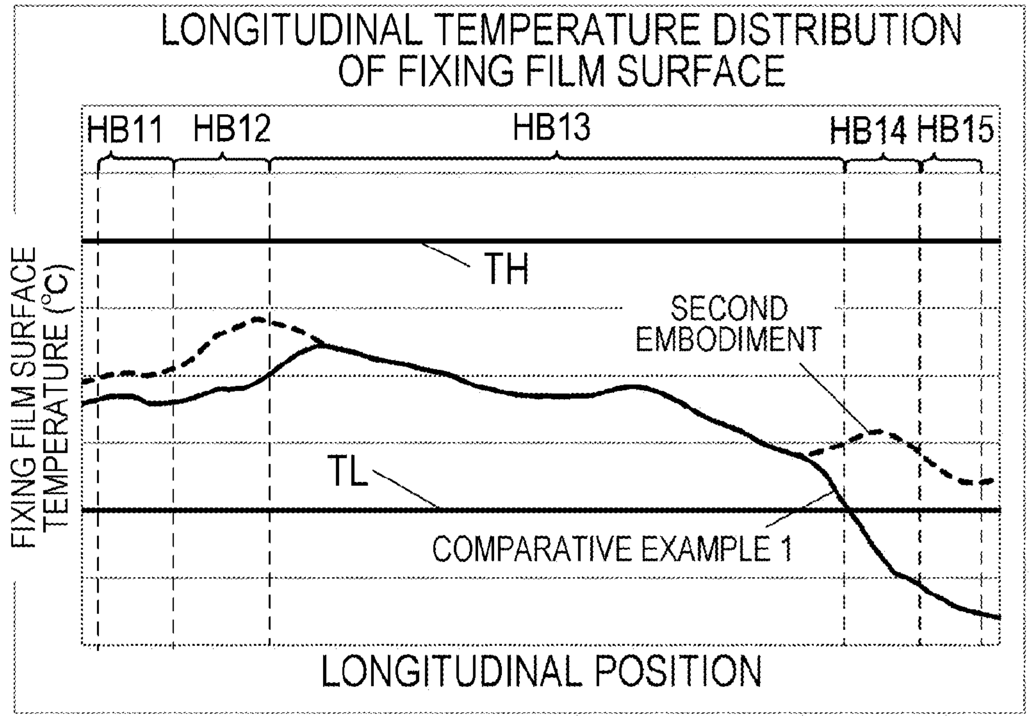
FIGS. 14A and 14B are longitudinal temperature distribution diagrams of a surface of a fixing film according to the second embodiment.
Figure 14B:
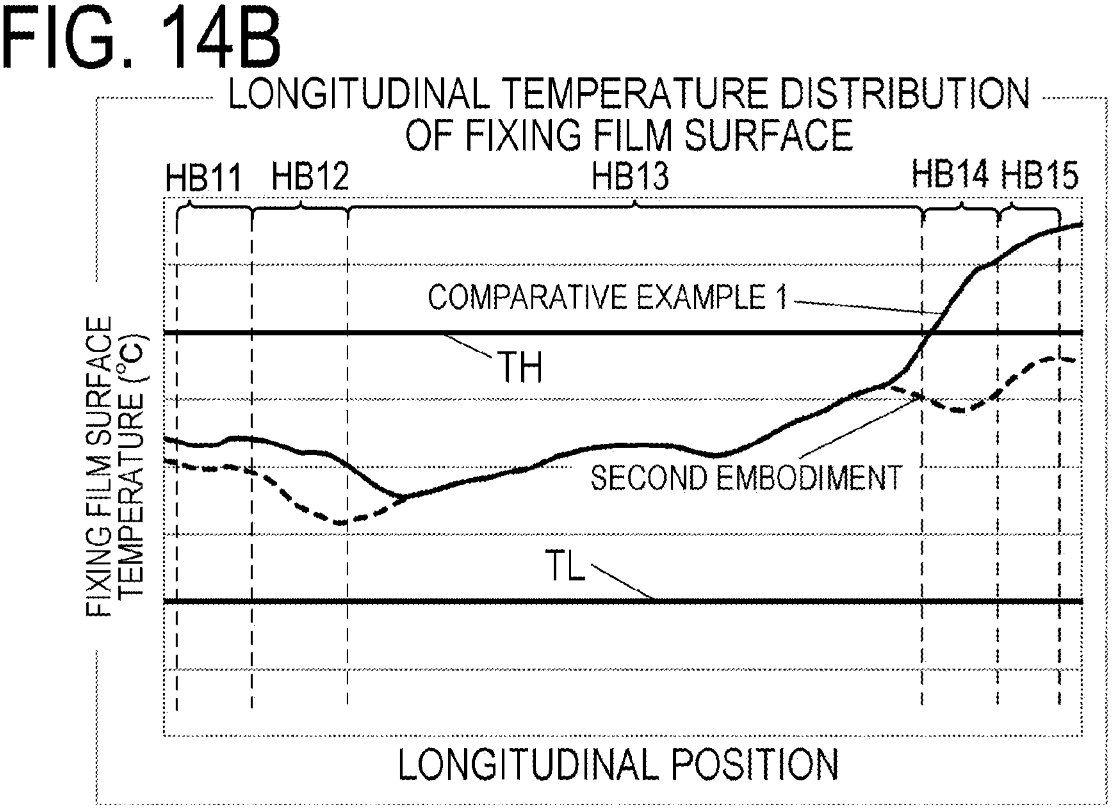

Next, longitudinal temperature distribution on the surface of the fixing film 25 according to the second embodiment will be described with reference to FIGS. 14A and 14B. The longitudinal temperature distribution on the surface of the fixing film 25 in a case of performing temperature regulation with the fixing apparatus according to the second embodiment using the heater CH is shown by a dotted line in FIG. 14A. The surface temperature of the fixing film is above TL over the entire longitudinal region in the second embodiment, as shown in FIG. 14A, and faulty fixing does not occur. Also, the longitudinal temperature distribution on the surface of the fixing film 25 in a case of performing temperature regulation with the fixing apparatus according to the second embodiment using the heater DH is shown by a dotted line in FIG. 14B. The surface temperature of the fixing film is below TH over the entire longitudinal region in the second embodiment, as shown in FIG. 14B, and hot offset does not occur.

As described above, variance in longitudinal temperature distribution of the fixing film 25 can be reduced by using the fixing apparatus according to the second embodiment. Accordingly, occurrence of faulty fixing and hot offset can be suppressed. Further, the temperature difference among heat-generating blocks HB, specifically, the temperature difference between the heat-generating block HB11 and the heat-generating block HB12, and between the heat-generating block HB14 and the heat-generating block HB15, can be reduced. Accordingly, occurrence of faulty images due to temperature difference among heat-generating blocks HB, such as gloss non-uniformity, for example, can be suppressed.

Third Embodiment

A characteristic of the fixing apparatus according to a third embodiment is that the thermistor 510 that performs temperature detection is a printed thermistor formed on the substrate 1105 of the heater 1100, and a plurality of printed thermistors are formed in each individual heat-generating block HB. Other configurations are the same as in the first embodiment, and accordingly repetitive description will be omitted. Items not described in particular here in the third embodiment are the same as in the first and second embodiments.

Figure 15A:
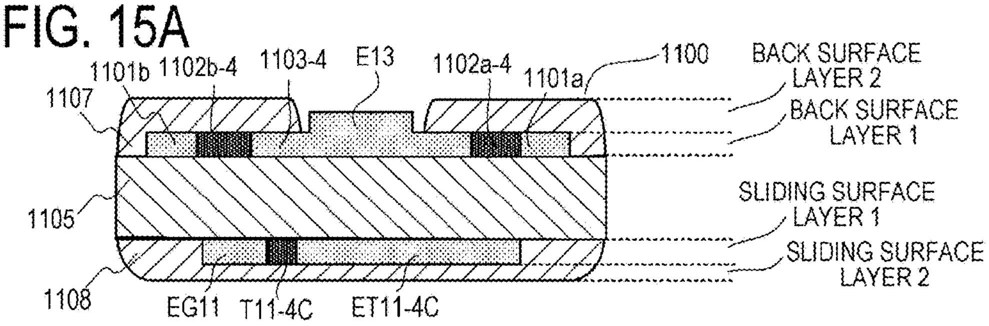
FIGS. 15A to 15C are diagrams illustrating a configuration of a heater according to a third embodiment.
Figure 15B:
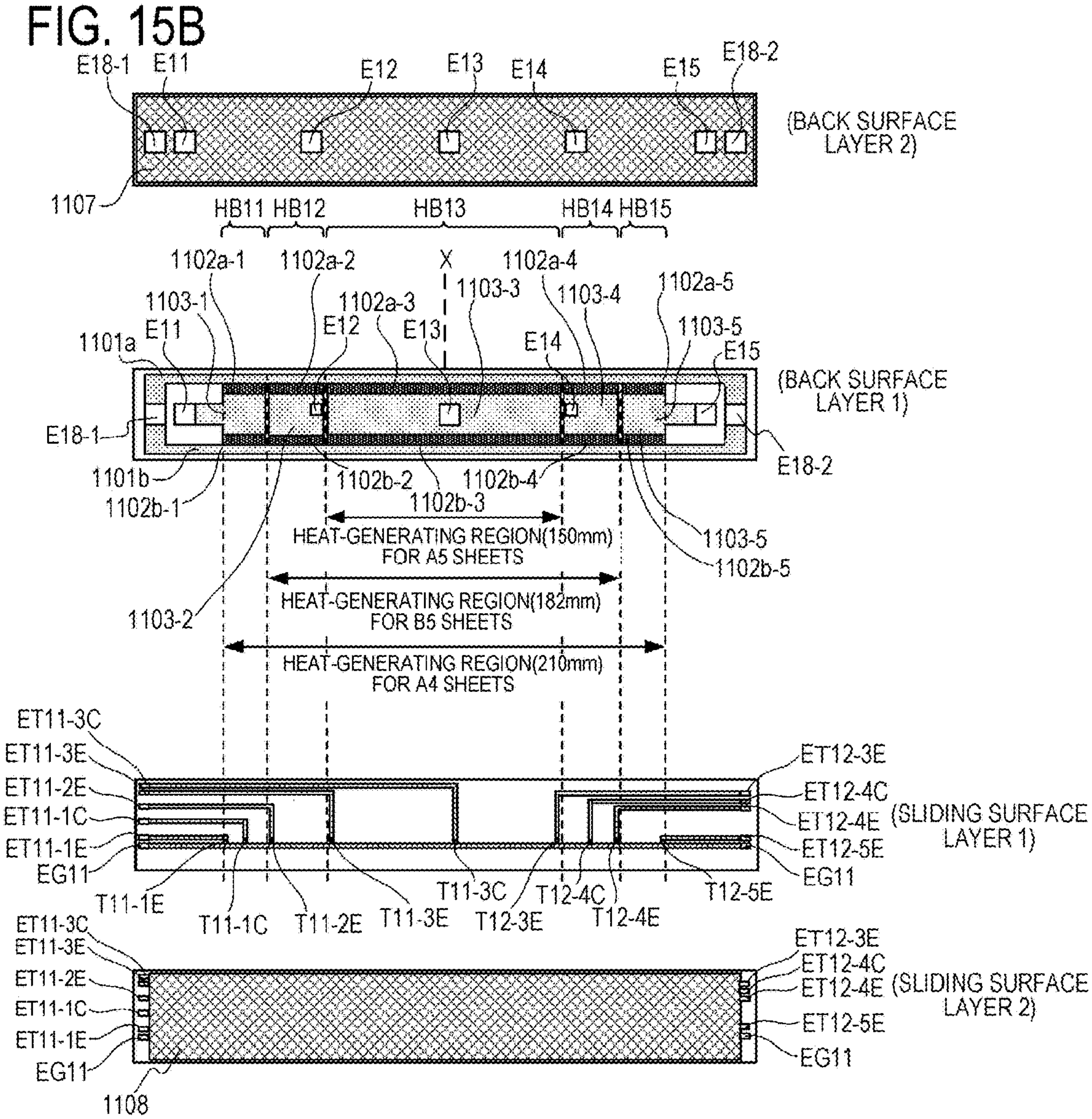
Figure 15C:
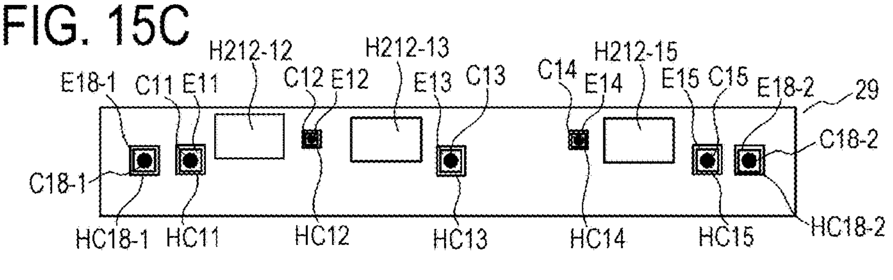

The disposing positions of the thermistors according to the third embodiment will be described with reference to FIG. 15B. The heater 1100 according to the third embodiment is provided with a sliding surface layer 1 in which the printed thermistors are provided, and a sliding surface layer 2 that covers the sliding surface layer 1, on the sliding face side that comes into contact with the fixing film 25. The plurality of printed thermistors for detecting the temperatures of the heat-generating blocks HB11 to HB15 are formed in the sliding surface layer 1 of the heater 1100. The plurality of thermistors are respectively denoted by T11-1C, T11-3C, T11-1E to T11-3E, T12-4C, and T12-3E to T12-5E in FIG. 15B. A material that has a great positive or negative temperature coefficient of resistance (TCR) is sufficient as a material for the thermistors. In the present third embodiment, a material having negative temperature coefficient (NTC) properties, in which the TCR is negative, is thinly printed on the substrate 1105, thereby forming the thermistors.

Next, the thermistor layout in each of the heat-generating blocks HB will be described. In the present third embodiment, two or more thermistors are placed in each of the heat-generating blocks HB11 to HB15, as illustrated in FIG. 15B. For example, two thermistors T11-1C and T11-1E are disposed in the heat-generating block HB11, and electroconductive patterns ET11-1C and ET11-1E for detecting resistance, and a common electroconductive pattern EG11, are configured to detect the temperature of the thermistors. The thermistor T11-1C is a thermistor for detecting the temperature at the center region of the heat-generating block HB11, and is placed at the substantially middle portion of the heat-generating block HB11 with respect to the width direction of the recording material P. Also, the thermistor T11-1E is an end-portion thermistor for detecting the temperature at the end-portion region of the heat-generating block HB11, and is placed at a position in the region of the heat-generating block HB11 that is the farthest from the convey reference position X with respect to the width direction of the recording material P. In this way, the thermistors T11-1C, T11-3C, and T12-4C for detecting the temperature at the center regions are placed in the heat-generating blocks HB11, HB13, and HB14. Also, end portion thermistors T11-1E to T11-3E, and T12-3E to T12-5E for detecting the temperature of the end-portion regions are placed in the respective heat-generating blocks HB11 to HB15.

In the present third embodiment, a temperature regulating thermistor that performs temperature regulation of the heat-generating blocks HB belonging to each heat-generating group is set in each heat-generating group. The thermistor T11-3C is set as the temperature regulation thermistor in the No. 1 heat-generating group, the thermistor T12-4C in the No. 2 heat-generating group, and the thermistor T11-1C in the No. 3 heat-generating group. Thus, in the third embodiment, the temperature regulation thermistors that perform temperature regulation control of the heat-generating blocks HB belonging to the respective heat-generating groups are placed at laterally-distanced positions across the conveyance reference of the recording material P, in adjacent heat-generating groups. Thus, even in a case in which there is variance in the resistance values of the heater 1100, occurrence of faulty fixing and hot offset can be suppressed.

Note that in the present third embodiment, it is sufficient for the temperature regulation thermistors of adjacent heat-generating groups to be placed laterally distanced from each other across the conveyance reference, and this does not apply to thermistors of which the object is temperature detection. For example, supplementary roles may be given, such as using the detection results of the thermistor T12-5E disposed in the region of the heat-generating block HB15 to change the temperature regulation temperature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087676, filed on May 25, 2021, which is hereby incorporated by reference herein in its entirety.

What is claimed is:

1. An image heating apparatus, comprising:

a heater that includes a plurality of heat-generating blocks arrayed in a width direction of a recording material that is orthogonal to a conveying direction of the recording material;

a nip forming portion forming a nip that nips the recording material;

a temperature-detecting portion that detects a temperature of the heater; and a control portion that controls electric power to be supplied to the plurality of heat-generating blocks, on the basis of the temperature detected by the temperature-detecting portion, wherein the image heating apparatus heats an image formed on recording material nipped by the nip, by heat of the heater, wherein the plurality of heat-generating blocks have a first heat-generating group and a second heat-generating group, wherein the first heat-generating group includes first and fourth heat-generating blocks symmetrically laid out with a conveyance reference position of the recording material in the width direction as a reference, and the second heat-generating group includes second and third heat-generating blocks symmetrically laid out with the conveyance reference position, placed at positions in the width direction different from the positions at which the first and fourth heat-generating blocks are placed, wherein the temperature-detecting portion includes a first temperature-detecting element for detecting the temperature of the first heat-generating block, a second temperature-detecting element for detecting the temperature of the second heat-generating block, a third temperature-detecting element for detecting the temperature of the third heat-generating block, and a fourth temperature-detecting element for detecting the temperature of the fourth heat-generating block, wherein, in a case of heating the image formed on the recording material at the nip forming portion, the control portion supplies electric power via a first switch to the first heat-generating group to maintain a detected temperature detected by the first temperature-detecting element at a control target temperature, and supplies electric power via a second switch to the second heat-generating group to maintain a detected temperature detected by the third temperature-detecting element at a control target temperature, wherein the first temperature-detecting element is placed on a center position of the first heat-generating block in the width direction, and is placed on one side as to the conveyance reference position in the width direction, wherein the third temperature-detecting element is placed on a center position of the third heat-generating block in the width direction, and is placed on other side as to the conveyance reference position in the width direction, wherein the second temperature-detecting element is placed on an end position of the second heat-generating block in the width direction, and is placed on the one side as to the conveyance reference position in the width direction, and wherein the fourth temperature-detecting element is placed on an end position of the fourth heat-generating block in the width direction, and is placed on the other side as to the conveyance reference position in the width direction.

2. The image heating apparatus according to claim 1, wherein the first heat-generating group and the second heat-generating group are adjacent to each other in the width direction.

3. The image heating apparatus according to claim 1, wherein the nip forming portion includes a cylindrical film on an inner side of which the heater is placed, and a pressure member that comes into contact with an outer face of the film, and wherein the nip is formed by the heater and the pressure member via the film, between the film and the pressure member.

4. The image heating apparatus according to claim 3, wherein the first temperature-detecting element, the second temperature-detecting element, the third temperature-detecting element, and the fourth temperature-detecting element are placed in contact with a face of the heater that is on an opposite side from a face that forms the nip with the pressure member.

5. The image heating apparatus according to claim 1, wherein the first temperature-detecting element, the second temperature-detecting element, the third temperature-detecting element, and the fourth temperature-detecting element are thermistors.

6. The image heating apparatus according to claim 1, wherein the heater includes a substrate on which the plurality of heat-generating blocks are formed, and wherein the first temperature-detecting element, the second temperature-detecting element, the third temperature-detecting element, and the fourth temperature-detecting element are printed thermistors formed on the substrate.

7. The image heating apparatus according to claim 1, wherein each of the first to fourth heat-generating blocks includes a heat-generating resistor that generates heat by electric power, and the image heating apparatus further comprises:

a processor that functions as a resistance distribution acquisition portion that acquires a distribution of resistance of the heat-generating resistor in the width direction of the heater, and wherein the control portion controls electric power to be supplied to the plurality of heat-generating blocks based at least on the distribution acquired by the resistance distribution acquisition portion and the temperature detected by the temperature-detecting portion.

8. The image heating apparatus according to claim 7, wherein the control portion controls electric power to be supplied to the plurality of heat-generating blocks while maintaining a temperature difference of the first heat-generating group and the second heat-generating group within a predetermined value.

* * * * *